(12) United States Patent
Fukasawa

(10) Patent No.: US 7,049,977 B2
(45) Date of Patent: May 23, 2006

(54) ANTENNA UNIT AND CARD PROCESSING SYSTEM

(75) Inventor: Kazuo Fukasawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 170 days.

(21) Appl. No.: 10/760,560

(22) Filed: Jan. 21, 2004

(65) Prior Publication Data

US 2004/0155796 A1 Aug. 12, 2004

(30) Foreign Application Priority Data

Jan. 21, 2003 (JP) ............................. 2003-012820

(51) Int. Cl.
    G08G 1/065 (2006.01)
    G08G 1/00 (2006.01)
(52) U.S. Cl. ..................... 340/928; 235/383; 902/33
(58) Field of Classification Search ................ 340/928, 340/10.1, 10.2; 235/383, 384, 462.32; 902/33
    See application file for complete search history.

(56) References Cited

U.S. PATENT DOCUMENTS

| 4,084,149 A | 4/1978 | Driver et al. |
| 4,243,980 A | 1/1981 | Lichtblau |
| 4,493,103 A | 1/1985 | Yamashita et al. |
| 4,735,289 A | 4/1988 | Kenyon |
| 4,866,455 A | 9/1989 | Lichtblau |
| 5,644,119 A | 7/1997 | Padula et al. |
| 6,138,912 A * | 10/2000 | Mitsuno ..................... 235/384 |
| 6,299,066 B1 * | 10/2001 | Howland et al. ...... 235/462.32 |

FOREIGN PATENT DOCUMENTS

| FR | 2 803 072 A1 | 6/2001 |
| JP | 3256642 | 11/2001 |
| WO | WO 01/40107 A1 | 6/2001 |
| WO | WO 02/01485 A1 | 1/2002 |

* cited by examiner

Primary Examiner—John Tweel, Jr.
(74) Attorney, Agent, or Firm—Pillsbury Winthrop Shaw Pittman LLP

(57) ABSTRACT

An antenna portion 46 retaining in a tip portion thereof antenna coils 49 configured to perform wireless communication with an IC card through an electromagnetic coupling is structured to be freely movable forward/backward between a protruding position above a lane and a retracted position in a unit. An antenna head portion 48 of the antenna unit 46 protrudes above the lane and the antenna coils 49 become close to a vehicle on the lane, so that a distance between the driver of a vehicle and the antenna coils 49 is shortened and the user can present an IC card 80 inside a communication distance of an antenna without any difficulty.

18 Claims, 24 Drawing Sheets

FALL AWAY

DEVELOPED STATE

ANTENNA UNIT AND CARD PROCESSING SYSTEM

CROSS REFERENCE TO RELATED APPLICATIONS

This application is based upon and claims the benefit of priority from the prior Japanese Patent Applications No. 2003-12820, filed on Jan. 21, 2003; the entire contents of which are incorporated herein by reference.

BACKGROUND

1. Field of the Invention

The present invention relates to a card processing system, for example, for payment of tolls of toll roads by a prepaid-type IC card, and an antenna unit used for this system.

2. Description of the Related Art

Currently, magnetic-type prepaid cards (hereinafter, referred to as magnetic cards) that are widely available in the market are highly convenient for users in that they can be used anonymously for an indefinite term by an unspecified number of persons. On the other hand, the magnetic cards are always accompanied by a risk of unauthorized rewriting of data such as amount information and has a security weakness, so that the operation of magnetic cards are generally performed in such a manner that the subtraction of balance amount is only performed in the use of magnetic cards, and they are disposed of when their balance amount becomes zero.

Thus, in recent years, for the purpose of increasing security, such a highly convenient magnetic card as described above is replaced by an IC card. For example, as described in Japanese Patent No. 3256642, in public transport such as railroads, there is already realized a card processing system using a wireless-type prepaid IC card that allows entrance and exit by bringing it into contact with or presenting it above an automatic ticket checker installed at a ticket gate of a railroad station or the like. A wireless system is disclosed, for example, in U.S. Pat. No. 4,243,980 and U.S. Pat. No. 4,866,455.

This wireless-type prepaid IC card (hereinafter, referred to as an IC card) is considered to be introduced to a toll collection on toll roads. In this application of the IC card to the toll collection on toll roads, an operation is assumed that a person holds out the IC card to inside of a distance which allows communication with an antenna while the person is staying in a vehicle.

Generally, on the automatic ticket checker, when either surface of the IC card is positioned to face an antenna surface, magnetic flux in a direction perpendicular to these surfaces passes through respective coils of both the antenna and card, and an induced voltage generated by induced magnetic flux of these two coils are used to realize power transmission and wireless communication. Incidentally, the communication distance of the IC card of an electromagnetic induction type is 100 mm or less.

However, there is expected a situation to occur that, when a vehicle is stopped at a position away from the antenna, the IC card held out from a window of the vehicle cannot reach inside the communication distance with the antenna. In addition, regarding the introduction of the IC card to toll roads, since there exists a construction gage (250 mm for expressways for example) as a contacting clearance between a vehicle and a building, holding out the IC card to reach inside the communication distance with the antenna is possible but may be difficult for a driver of the vehicle, even with a pulling over of the vehicle to a roadside device being taken into consideration.

It is an object of the present invention to provide an antenna unit and a card processing system which allow a user to present an IC card inside a communication distance of an antenna of a roadside device without any difficulty.

Further, it is an object of the present invention to provide an antenna unit and a card processing system which are capable of increasing reliability of communication between an IC card and an antenna.

BRIEF SUMMARY OF THE INVENTION

An antenna unit according to a first embodiment of the present invention is an antenna unit installed on a roadside portion of a lane where a processing regarding use of a toll road is performed to a vehicle passing through the toll road, the antenna unit characterized in that it includes: an antenna retaining portion retaining in a tip portion thereof an antenna coil configured to perform wireless communication with an IC card through an electromagnetic coupling; and a drive mechanism configured to freely move the antenna retaining portion backward and forward between a position where the antenna retaining portion protrudes above the lane and a position where the antenna retaining portion is retracted in the antenna unit.

The antenna retaining portion retaining the antenna coil in the tip portion thereof protrudes above the lane and the antenna coil becomes close to the vehicle on the lane, so that a distance between the driver of the vehicle and the antenna coil is shortened and the user can present the IC card inside a communication distance of an antenna without any difficulty.

Further, an antenna unit according to a second embodiment of the present invention is an antenna unit as set forth in the first invention, characterized in that it further includes: a sensor configured to sense that the tip portion of the antenna retaining portion comes in contact with or approaches the vehicle; and a control unit configured to control the drive mechanism to stop movement of the antenna retaining portion when a contact with or an approach to the vehicle is sensed by the sensor while the antenna retaining portion is moved by the drive mechanism from the retracted position in the unit to the protruding position above the lane.

When the sensor senses that the tip portion of the antenna retaining portion comes in contact with or approaches the vehicle while the antenna retaining portion is moved from the retracted position in the unit to the protruding position above the lane, the movement of the antenna retaining portion is immediately stopped, so that the level of damage due to a contact of the antenna retaining portion with the vehicle, which may possibly occur when the antenna retaining portion protrudes above the lane, can be decreased.

Further, an antenna unit according to a third embodiment of the present invention is an antenna unit as set forth in the first embodiment, characterized in that the antenna retaining portion are further separable into an antenna head portion equipped with the antenna coil and a support portion supporting the antenna head portion on a tip thereof, and that the antenna head portion is mounted to be removable from the support portion by a push from a vehicle traveling direction on the lane.

In case the tip portion comes in contact with a vehicle and is pushed toward the vehicle traveling direction while the antenna retaining portion is protruding above the lane, the antenna head portion falls away from the tip of the support portion so that the shock to the antenna retaining portion is alleviated to thereby prevent breakage.

Further, an antenna unit according to a fourth embodiment of the present invention is an antenna unit as set forth in the first embodiment, characterized in that the antenna retaining portion retains two antenna coils in the tip portion thereof, and that the two antenna coils are respectively wound along a substantially vertical surface, and vertically aligned and arranged in proximity to each other in the tip portion of the antenna retaining portion.

When electric currents are passed through the respective antenna coils, magnetic flux having a high density is generated in a direction perpendicular to the front side of the respective antenna coils. When the IC card is moved closer to the respective antenna coils in a posture that the main surfaces of the IC card face upward/downward, the density of magnetic flux in a vertical direction passing through the coil in the IC card increases and the antenna coils are electromagnetically coupled to the coil in the IC card in an efficient manner, so that a large mutual inductance is ensured to improve power transmission efficiency, thereby realizing excellent communication.

Incidentally, the two antenna coils should not necessarily be respectively wound along the substantially vertical surface, and aligned vertically and arranged in proximity to each other. The two antenna coils may be wound along substantially the same surface, and arranged along the substantially same surface in proximity to each other.

An antenna unit according to a fifth embodiment of the present invention is an antenna unit as set forth in the first embodiment, characterized in that the antenna retaining portion includes on the tip portion thereof: two first antenna coils wound respectively along a substantially horizontal surface and arranged separately and opposite to each other; and a second antenna coil arranged to cover substantially one side of a space between the two first antenna coils and to be wound along a substantially vertical surface.

By thus combining the three antenna coils, the magnetic flux in the vertical direction can be generated extensively in high density between the two antenna coils arranged opposite to each other. Therefore, by arranging the IC card in a horizontal direction between the two antenna coils arranged opposite to each other, the efficient electromagnetic coupling of the antenna coils to the coil in the IC card is realized, thereby realizing the excellent communication. Incidentally, not limited to the above arrangement, these may be arranged in such a manner that the two first antenna coils are wound along a first surface to be spaced apart and arranged opposite to each other, and the second antenna coil is wound along a second surface which is substantially orthogonal to the first surface, so as to substantially cover one second surface of the space between the two first antenna coils.

An antenna unit according to a sixth embodiment of the present invention is an antenna unit as set forth in the first embodiment, characterized in that the antenna unit includes a plurality of the antenna retaining portions, and that each of the plural antenna retaining portions moves independently forward and backward between the position where the antenna retaining portion protrudes above the lane and the position in the unit.

An antenna unit according to a seventh embodiment of the present invention is an antenna unit as set forth in the sixth embodiment, characterized in that it includes: a plurality of transmitters and receivers configured to perform transmission/reception of signals separately using the antenna coil of each of the plural antenna retaining portions; and a communication control unit configured to measure each electromagnetic field intensity or reception intensity based on received signals from each of the receivers and select one combination of the transmitter and the receiver to actively function.

An antenna unit according to an eighth embodiment of the present invention is an antenna unit as set forth in the sixth embodiment, characterized in that it includes: a plurality of transmitters and receivers configured to perform transmission/reception of signals separately using the antenna coil of each of the plural antenna retaining portions; and a communication control unit configured to time-divisionally process communication using respective combinations of the transmitters and the receivers and activate one combination of the transmitter and the receiver to which a link is made first.

An antenna unit according to a ninth embodiment of the present invention is an antenna unit as set forth in the sixth embodiment, characterized in that it includes: a plurality of transmitters and receivers configured to perform transmission/reception of signals separately using the antenna coil of each of the plural antenna retaining portions; and a communication control unit configured to time-divisionally process communication using respective combinations of the transmitters and the receivers to activate one combination of the transmitter and the receiver to which a link is made first, and measure each electromagnetic field intensity or reception intensity based on received signals from each of the receivers to successively switch to one combination of the transmitter and the receiver which are optimum.

According to these inventions, communication problems arising from the simultaneous electromagnetic coupling of a coil in the IC card to the antenna coils of the plural antenna retaining portions can be eliminated.

A card processing system according to a tenth embodiment of the present invention is characterized in a card processing system which performs a processing regarding use of a toll road for a vehicle passing through the toll road, the card processing system comprising: an antenna unit which has an antenna retaining portion retaining in a tip portion thereof an antenna coil configured to perform wireless communication with an IC card through an electromagnetic coupling, and a drive mechanism configured to freely move the antenna retaining portion backward and forward between a position where the antenna retaining portion protrudes above the lane and a position where the antenna retaining portion is retracted in the unit; a vehicle stop detecting unit configured to detect a stopping of a vehicle on the lane; and a control unit configured to control the drive mechanism of the antenna unit so that the antenna retaining portion protrudes above the lane when the vehicle stop detecting unit detects the stopping of the vehicle on the lane.

A card processing system according to a eleventh embodiment of the present invention is a card processing system as set forth in the tenth embodiment, characterized in that the vehicle stop detecting unit comprises: an image pickup device configured to pick up an image of the lane; and a sensing unit configured to sense existence of the vehicle on the lane, and the control unit controls the drive mechanism of the antenna unit so that the antenna retaining portion protrudes above the lane when a movement is not detected in an image picked up by the image pickup device and the sensing unit senses the existence of the vehicle on the lane.

A card processing system according to a twelfth embodiment of the present invention is a card processing device as set forth in the tenth embodiment, characterized in that it further includes: a card approach detecting unit configured to detect an approach of the IC card to a tip of the antenna retaining portion; and a control unit configured to control the drive mechanism of the antenna unit so that the antenna retaining portion protrudes above the lane when the card approach detecting unit detects the approach of the IC card to the tip of the antenna retaining portion. A card processing system according to a thirteenth embodiment of the present invention is a card processing device as set forth in the twelfth embodiment, characterized in that the card approach detecting unit further comprises: an image pickup device configured to pick up an image between the antenna unit and the vehicle on the lane; and a recognizing unit configured to recognize an extension of an arm from the vehicle as the approach of the IC card to the tip of the antenna retaining portion based on the image picked up by the image pickup device. A card processing system according to a fourteenth embodiment of the present invention is a card processing system as set forth in the twelfth embodiment, characterized in that the card approach detecting unit is configured to detect a disturbance in a magnetic field formed by the antenna coils.

By a card processing system according to these inventions, the antenna retaining portion can protrude above the lane at a safe timing.

An antenna unit according to a fifteenth embodiment of the present invention is an antenna unit installed on a roadside portion of a lane where a processing regarding use of a toll road is performed for a vehicle passing through the toll road, characterized in that it includes: an antenna portion which has a plurality of antenna coil configured to perform wireless communication with an IC card through an electromagnetic coupling; a transceiver configured to perform transmission/reception of signals separately using the antenna coil of the antenna portion; and a communication control unit configured to select one of the plurality of antenna coil to actively function based on received signals from the transceiver. An antenna unit according to a sixteenth embodiment of the present invention is an antenna unit as set forth in the fifteenth embodiment, characterized in that the communication control unit time-divisionally and successively drives the plurality of antenna coil and activates one of the plurality of antenna coil to which a link is made first. An antenna unit according to a seventeenth embodiment of the present embodiment is the antenna unit as set forth in the fifteenth invention, characterized in that the communication control unit time-divisionally and successively drives the plurality of antenna coils and activates one of the plurality of antenna coils to which a link is made first, and measures each electromagnetic field intensity or reception intensity based on received signals from the transceiver and successively switches to one of the plurality of antenna coils which are optimum. An antenna unit according to a eighteenth invention of the present embodiment is the antenna unit as set forth in the fifteenth invention, characterized in that it further comprises a suspension control unit configured to stop driving the antenna coil which is not selected.

By an antenna unit according to these inventions, the communication problems arising from the simultaneous electromagnetic coupling of the coil in the IC card to the antenna coils of the plurality of antenna retaining portions can be eliminated. By an antenna unit according to these inventions, an efficient electromagnetic coupling of the antenna coils to the coil inside the IC card becomes possible, which allows stable communication.

BRIEF DESCRIPTION OF THE DRAWINGS

The present invention is described with reference to the drawings, but these drawings are provided solely for the purpose of illustration and not for limiting the invention by any means.

DETAILED DESCRIPTION OF THE INVENTION

Hereinafter, embodiments of the present invention will be explained in detail with reference to the drawings.

Figure 1:
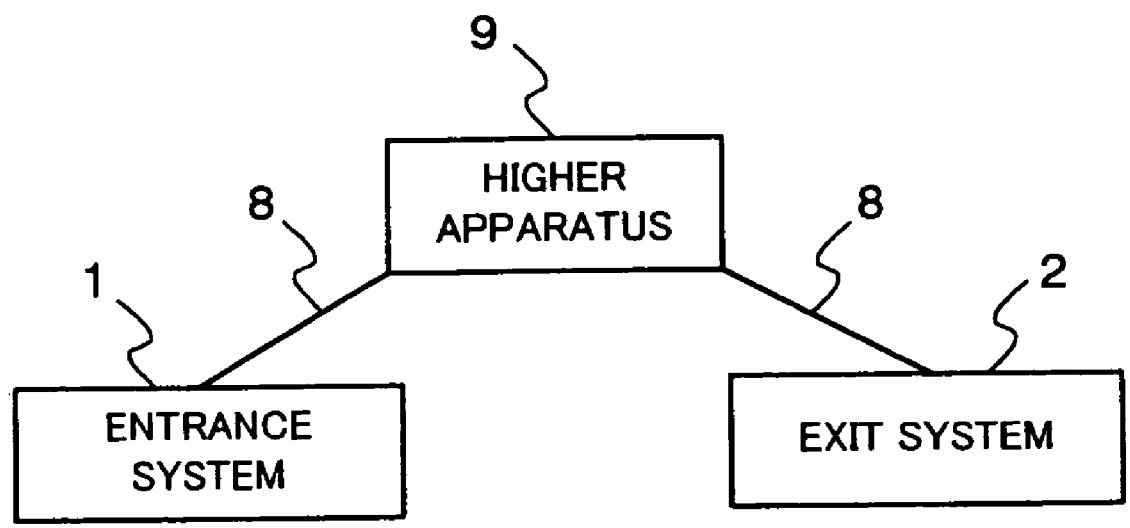
FIG. 1 is a view showing the structure of a toll collecting system of one embodiment according to the present invention.

FIG. 1 is a view showing a toll collecting system for a toll road that is one embodiment of a card processing system according to the present invention.

As shown in the view, the toll collecting system of this embodiment has an entrance system 1 installed at an entrance of a toll road, an exit system 2 installed at an exit of the toll road, and a higher apparatus 9 such as a host computer connected through communication lines 8 to the entrance system 1 and exit system 2. The higher apparatus 9 has functions to receive, through the communication lines 8, a result of an exit processing performed inside and outside of a lane at the exit and entrance information from a card processing performed at the entrance, check the both information with each other, register an IC card for which a difference is recognized as an incorrect card in its database and deliver information of the incorrect card to the entrance or the exit of the toll road. Besides that, the information of the incorrect card may be delivered to the entrance or the exit of the toll road. Entrance processing data is recorded in the IC card, and a payment processing is performed at the exit accompanying the movement of the user based on the entrance information in the IC card.

Figure 2:
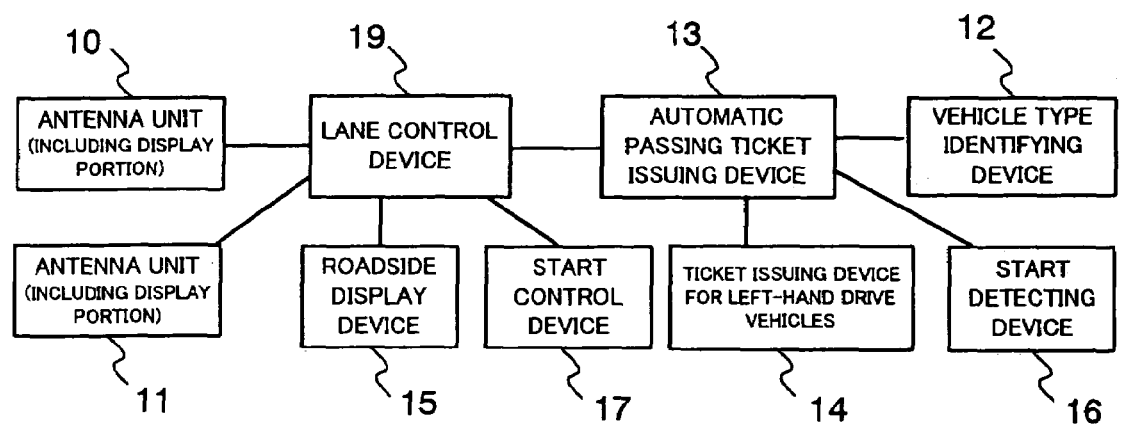
FIG. 2 is a view showing the structure of an entrance system of the toll collecting system in FIG. 1.
Figure 3:
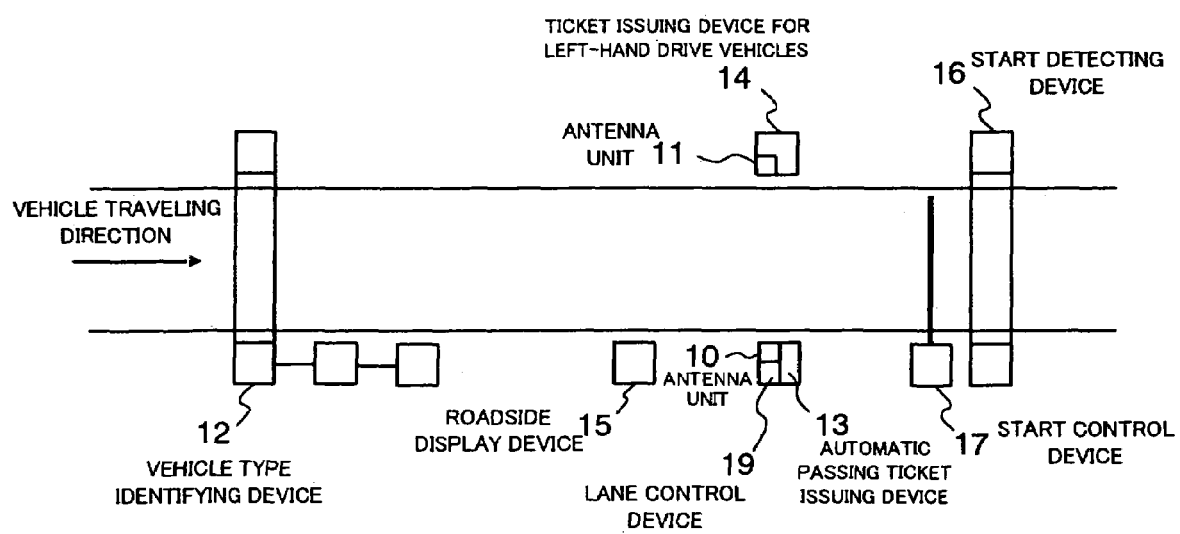
FIG. 3 is a device arrangement view of the entrance system in FIG. 2.

FIG. 2 is a view showing the structure of the entrance system of the toll collecting system in FIG. 1, and FIG. 3 is a schematic arrangement view of devices of the entrance system in FIG. 2.

As shown in these views, the entrance system 1 has an antenna unit 10, an antenna unit 11, a vehicle type identifying device 12, an automatic passing ticket issuing device 13, an automatic passing ticket issuing device 14 for left-hand drive vehicles (hereinafter, referred to as a ticket issuing device 14 for left-hand drive vehicles), a roadside display device 15, a start detecting device 16, a start control device 17, and a lane control device 19.

The antenna unit 10 in FIG. 3 is arranged at a position on a roadside portion (right side in the vehicle traveling direction) which a driver who stopped his/her vehicle after entering a lane can reach by hand from a window. The antenna unit 10 has antenna portions 46 as first antenna portions capable of protruding toward the lane at three heights, upper, middle, and lower heights. When a non-contact IC type prepaid card that is a wireless-type prepaid IC card (hereinafter, referred to as an IC card) approaches inside of a communication distance of this antenna portion 46, card information is read from the IC card by wireless communication. When the card information is correct, vehicle information, vehicle type information and entrance information are recorded in the IC card (an entrance processing) by wireless communication (non contact). The inside of a predetermined range is, different from the communication range of the ETC equipped vehicle, within a few hundreds of millimeters for example. Incidentally, "to approach" includes actions such as to touch (contact), to present (proximity) or the like.

In the IC card, an IC chip embedded therein stores card individual information (fixed information) such as a card ID number and variable information such as prepaid amount (balance amount) information, use history information, and the like as card information. The use history information includes vehicle information such as a license plate number of the vehicle, identified vehicle type information, entrance information, and the like identified during the entrance processing. Also, on the card surface, a card-specific card ID number is printed so that the IC card can be identified visually.

The antenna unit 11 is an antenna unit for drivers of left-hand drive vehicles, which is arranged at a position on a roadside (left side in the vehicle traveling direction) that is substantially opposite to the antenna unit 10 with the lane intervening therebetween. The vehicle type identifying device 12 detects a vehicle entering the lane, obtains vehicle information such as the number of axles, vehicle height, vehicle length, license plate and the like of the entering vehicle, and identifies the vehicle type of the vehicle from the obtained vehicle information. Here, the vehicle type means types of vehicle classified by an administration side of the toll road for the purpose of toll collection, which include large, large-special, medium, small, light car and the like for example.

The automatic passing ticket issuing device 13 issues a passing ticket according to the vehicle type of the entering vehicle when the entrance processing is completed abnormally such as occurrence of an error during the entrance processing on the IC card. The ticket issuing device 14 for left-hand drive vehicles is arranged at a position on a roadside portion that is substantially opposite to the automatic passing ticket issuing device 13 with the lane intervening therebetween, and issues a passing ticket to the driver of a left-hand drive vehicle. The roadside display device 15 displays a processing status and guidance contents to notify the guidance contents for vehicle to the driver of the vehicle.

The start detecting device 16 detects the start of a vehicle to exit from the lane after the driver of the vehicle takes a passing ticket, or the entrance processing using the IC card is performed. The start control device 17 is for permitting or blocking a passing of a vehicle according to the result of the entrance processing. The lane control device 19 is connected to the respective devices including the above-described antenna units 10 and 11 through communication lines, obtains information from the respective devices, and performs various processings regarding the use of a toll road (such as the entrance processing) and control of respective devices on the roadsides (control for activating/deactivating of the card processing function of the antenna units 10 and 11, control of opening/closing the start control device 17, and the like).

Incidentally, the above-described entrance system 1 and the exit system 2 are structure examples of systems for a distance-based charging system. For a flat rate system, in order to perform a collection processing for collecting tolls either at the entrance or at the exit of a toll road, the same device arrangement as that of the above-described exit system 2 is introduced to the entrance system 1. The flat rate system is a system of a mode to collect tolls of flat rate at once either at the entrance or at the exit of a toll road.

Figure 4A:
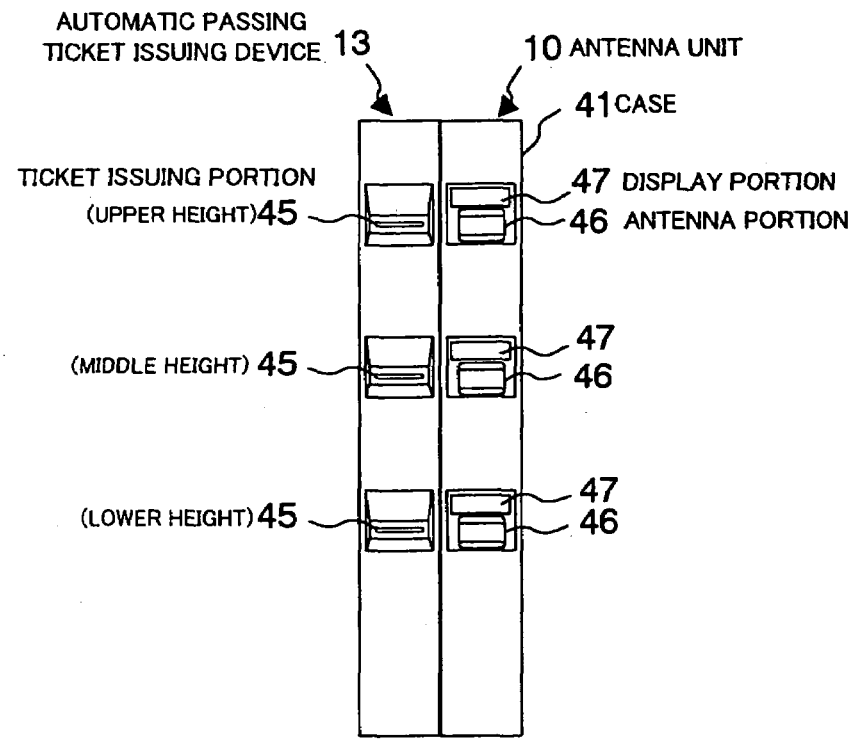
FIG. 4A is an arrangement view of an automatic passing ticket issuing device 13 and an antenna unit 10 at an entrance.
Figure 4B:
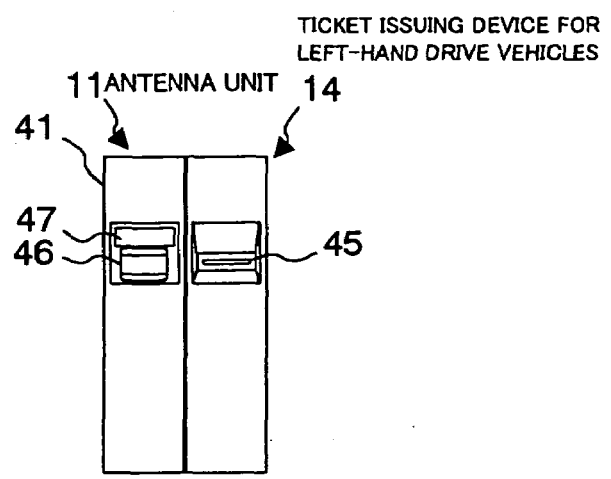
FIG. 4B is an arrangement view of a ticket issuing device 14 for left-hand drive vehicles and an antenna unit 11 at the entrance.

FIG. 4A is an arrangement view of the automatic passing ticket issuing device 13 and the antenna unit 10 at the entrance, and FIG. 4B is an arrangement view of the ticket issuing device 14 for left-hand drive vehicles and the antenna unit 11 at the entrance.

As shown in FIG. 4A, in the automatic passing ticket issuing device 13, plural ticket issuing portions 45 are arranged in a vertical direction (at different heights). These plural ticket issuing portions 45 of the automatic passing ticket issuing device 13 are referred to as first passing ticket issuing portions. Each of the ticket issuing portions 45 has functions to issue a passing ticket and to retract completely or to reissue thereafter by control of the lane control device 19.

The antenna unit 10 has a case 41 in a bar shape that is installed to stand on a roadside portion on the right side of the lane. In the case 41, an antenna portion 46 and a display portion 47 are arranged respectively at upper, middle, and lower heights. The antenna portion 46 and the display portion 47 at the upper height are for a vehicle having relatively higher seats such as a large size vehicle, bus, and the like. The antenna portion 46 and the display portion 47 at the middle height are for a vehicle having a height of a minivan and the like. The antenna portion 46 and the display portion 47 at the lower height are for a vehicle having relatively lower seats such as a sedan, light car, motorcycle, and the like. Each of the antenna portions 46 at the upper, middle, and lower heights is structured to protrude above the lane for communication with the IC card and to retract to the original position that is inside the case 41 after the communication is completed. Each of the display portions 47 lights up, blinks, or displays a message when the card processing function (wireless communication function) of the antenna portion 46 selected by the lane control device 19 is active.

As shown in FIG. 4B, in the ticket issuing device 14 for left-hand drive vehicles, a ticket issuing portion 45 is arranged at a position having the same height as that of the ticket issuing portion 45 at the lower height of the automatic passing ticket issuing device 13. The ticket issuing portion 45 has functions to issue a passing ticket and, depending on the circumstances, to temporarily retract the issued passing ticket, to retract it completely or to reissue it thereafter by control of the lane control device 19.

The antenna unit 11 has a case 41 in a bar shape that is installed to stand on a roadside portion on the left side of the lane. In the case 41, an antenna portion 46 and a display portion 47 are arranged at a position having substantially the same height as the lower height of the antenna unit 10. The antenna portion 46 and the display portion 47 are arranged at a position which a driver of a left-hand vehicle can reach by hand from a window. The antenna portion 46 is structured to protrude above the lane for communication with the IC card and to retract to the original position that is inside the case 41 after the communication is completed. The display portion 47 lights up, blinks, or displays a message when the card processing function (wireless communication function) of the antenna portion 46 is active.

Regarding corresponding relationships between the respective ticket issuing portions 45 and the antenna portions 46, the corresponding relationships with each other are controlled by an address management table, in the case of communication by a LAN or the like. Besides that, the corresponding relationships may be controlled by physical wirings, providing separate communication line systems.

Figure 5:
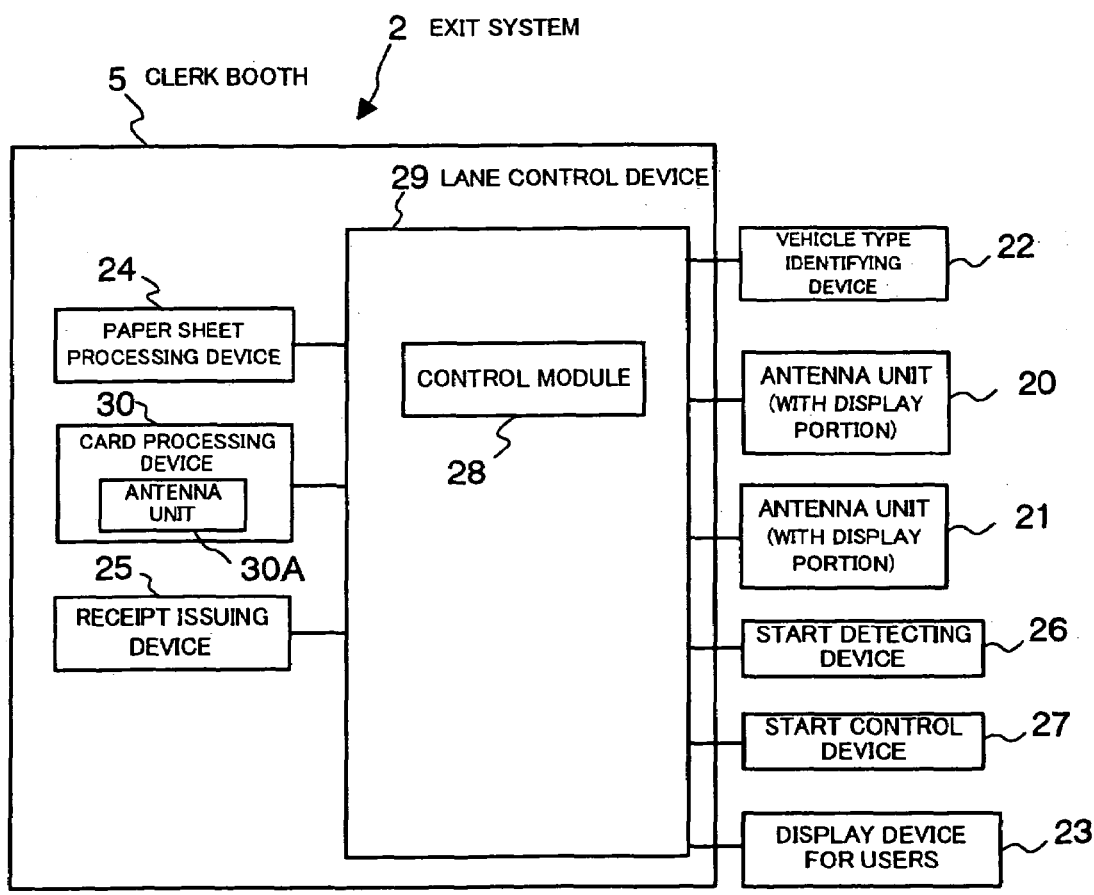
FIG. 5 is a view showing the structure of an exit system of the toll collecting system in FIG. 1.
Figure 6:
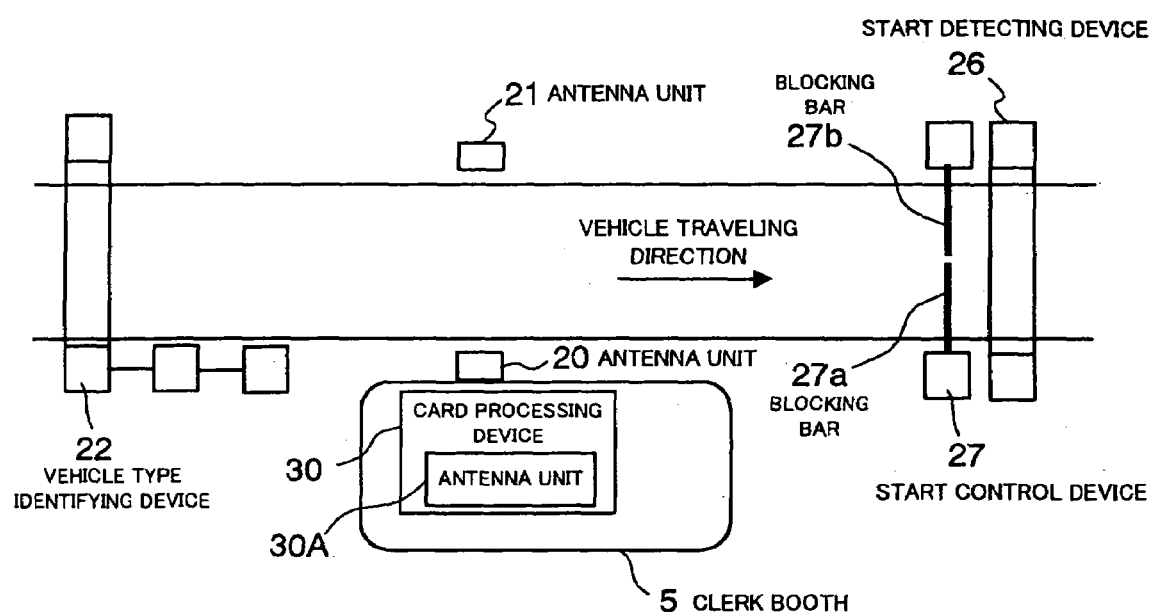
FIG. 6 is a device arrangement view of the exit system in FIG. 4.

FIG. 5 is a view showing a structure of the exit system, and FIG. 6 is a schematic arrangement view of devices of the exit system in FIG. 5.

As shown in these views, the exit system 2 is constituted by antenna units 20 and 21; a vehicle type identifying device 22; a display device 23 for users which performs display of an IC card processing status (an amount to be subtracted, a balance amount after the subtraction, and the like), display of instruction to insert a card to be processed or the like; a paper sheet processing device 24 which performs a processing of passing tickets or the like and displaying for a clerk, and to which the clerk performs inputting operation; a receipt issuing device 25 which issues utilization certificates and the like; a start detecting device 26; a start control device 27; a card processing device 30 in which a wireless communication means such as an antenna unit 30A is incorporated; a lane control device 29 including a control module 28 which obtains information of the IC card through the antenna unit 30A of the card processing device 30, performs processings related to toll collection, and performs control of respective roadside devices, and the like. The vehicle type identifying device 22 detects a vehicle that passes through a toll road and enters the lane (exit lane) of the exit (a vehicle exiting from the toll road) and obtains vehicle information such as the number of axles, vehicle height, vehicle length, license plate number, and the like of the vehicle, and identifies the vehicle type of the vehicle from the obtained vehicle information. Here, the vehicle type means types of vehicle which are classified by the administration side of the toll road for the purpose of toll collection, which include large, large special, medium, small, light car or the like for example. When the vehicle identification information from the entrance processing is used, installation of the vehicle type identification device at the exit is not necessary.

In the card processing device 30, arranged is an antenna unit 30A which reads information from the IC card by presenting the IC card above the device surface or bringing it into contact therewith, and writes processing results into the IC card. The control module 28 of the lane control device 29 has a memory or a CPU function, and a control program is stored therein for performing processings related to the IC card and a vehicle, and control of respective devices in a clerk booth 5 or respective devices on roadsides. Incidentally the control module 28 itself may be software.

The lane control device 29 carries out processings of the control module 28, various processings regarding the use of a toll road (the exit processing and the like), and control of the above-described respective devices. In the control module 28, exit information (the tollgate number, the lane number, toll information with respect to other tollgates, and the like) is stored in advance. The control module 28 (or the sheet paper processing device 24 or the like) calculates a toll (use toll) from the entrance information and the exit information stored (recorded) in the IC card or in the passing ticket of a vehicle exiting from the toll road and carries out a collection processing.

Figure 7:
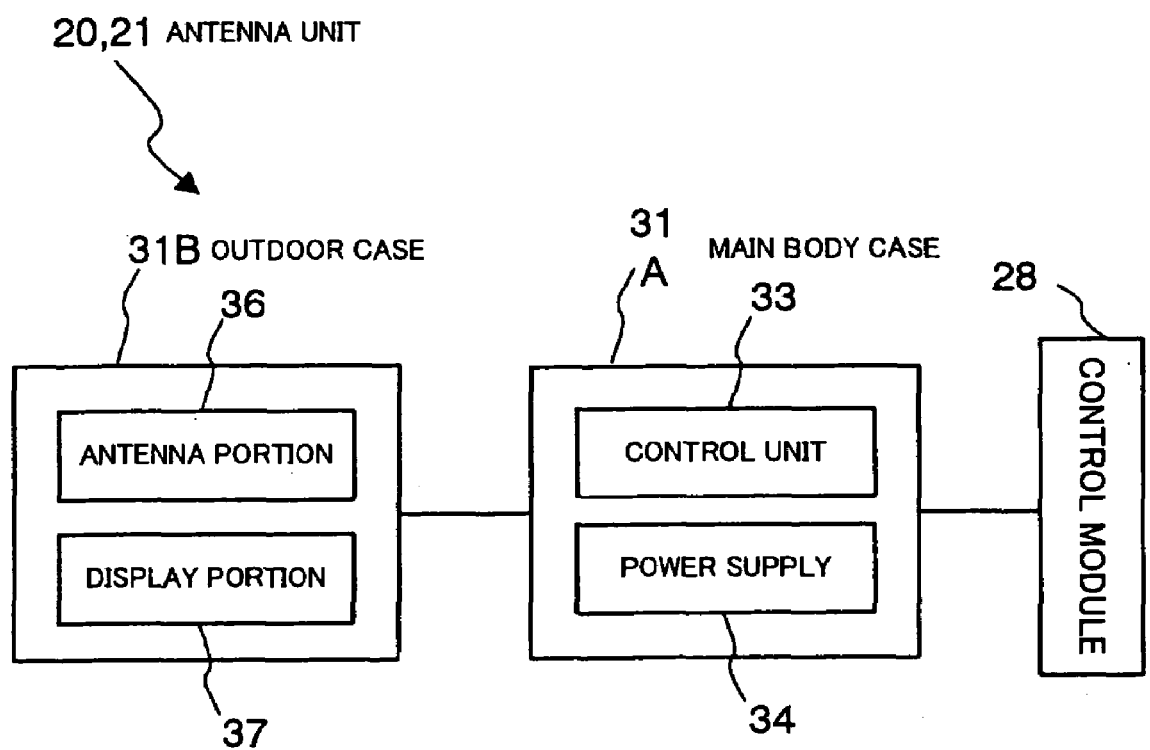
FIG. 7 is a view showing the structure of antenna units 20 and 21 at an exit.
Figure 8A:
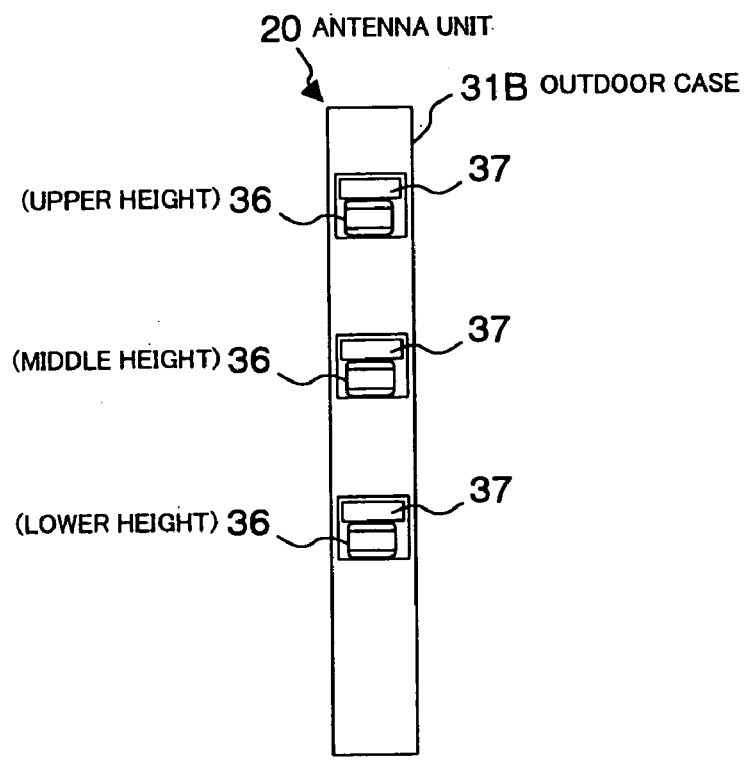
FIG. 8A is an exterior view of the antenna unit 20.
Figure 8B:
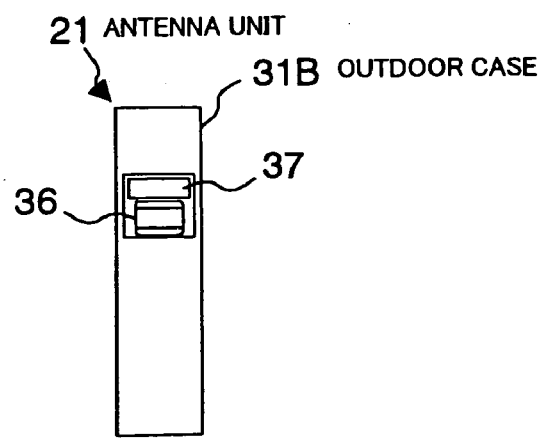
FIG. 8B is an exterior view of the antenna unit 21.

FIG. 7 is a view showing the structure of an antenna unit of the exit system in FIG. 6, and FIG. 8A is an exterior view of the antenna unit 20, and FIG. 8B is an exterior view of the antenna unit 21.

As shown in the views, the antenna units 20 and 21 are constituted by cases which are a main body case 31A and an outdoor case 31B connected by communication lines, a control unit 33, a power supply 34, an antenna portion 36, a display portion 37, and so forth, and connected to the lane control device 29 through the control unit 33. The main body case 31A accommodates the control unit 33 and the power supply 34. The outdoor case 31B accommodates the antenna portion 36 and the display portion 37. The control unit 33 centrally controls the entire system. Further, the control unit 33 is connected to the control module 28 of the lane control device 29, and performs the card processing on the IC card that is an object to be processed by communicating with the control module 28. The power supply 34 supplies power to each part of the system.

As shown in FIG. 8A, the antenna unit 20 has the outdoor case 31B in a bar shape that is installed to stand on a roadside portion on the right side of the lane. In the outdoor case 31B, the antenna portion 36 and the display portion 37 are arranged respectively at upper, middle, and lower heights. The antenna portion 36 and the display portion 37 at the upper height are for a vehicle having relatively higher seats such as a large size vehicle, bus, and the like. The antenna portion 36 and the display portion 37 at the middle height are for a vehicle having a height of a minivan and the like. The antenna portion 36 and the display portion 37 at the lower height are for a vehicle having relatively lower seats such as a sedan, light car, motorcycle, and the like. The respective antenna portions 36 at the upper, middle, and lower heights are structured to protrude above the lane for communication with the IC card and to retract to the original position that is inside the outdoor case 31B after the communication is completed. Each of the display portions 37 lights up, blinks, or displays a message when the card processing function (wireless communication function) of the antenna portion 36 selected by the lane control device 29 is active.

As shown in FIG. 8B, the antenna unit 21 has the outdoor case 31B in a bar shape that is installed to stand on a roadside portion on the left side of the lane. In the outdoor case 31B, the antenna portion 36 and the display portion 37 are arranged at a position that has substantially the same height as the lower height of the antenna unit 20. The antenna portion 36 and the display portion 37 are arranged at a position which a driver of a left-hand vehicle can reach by hand from a window. The display portion 37 lights up, blinks, or displays a message when the card processing function (wireless communication function) of the antenna portion 36 is active.

In the IC card used in this toll collecting system, namely, a non-contact prepaid IC card of wireless communication type which can be processed by the antenna unit 30A of the card processing device 30, the antenna units 10 and 11, an IC chip which is called a wireless tag and an antenna coil 49 formed by a patterning of a conductor on the substrate (a printed wiring of copper foil, or the like) are provided on the internal substrate.

Next, a protruding mechanism of the antenna portions 43 and 36 in the antenna units 10 and 11 of the entrance system 1, and in the antenna unit 20 and 21 of the exit system 2 will be explained. This protruding mechanism for the antenna portions 43 and 36 is common to the antenna units 10 and 11 of the entrance system 1 and the antenna units 20 and 21 of the exit system 2, so that the antenna unit 10 of the entrance system 1 will be explained as a representative.

Figure 9:
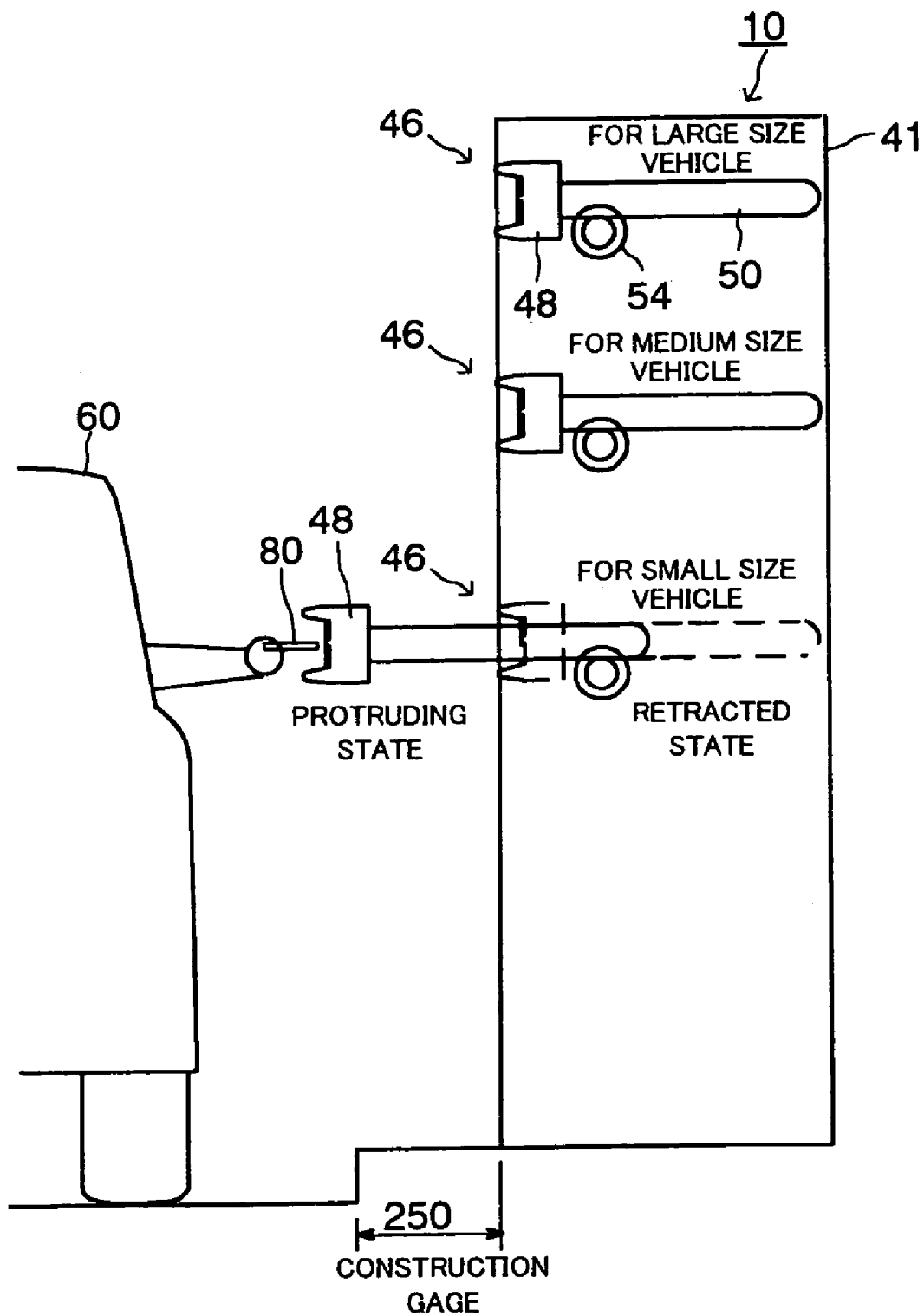
FIG. 9 is a side view of an antenna protruding mechanism in the antenna unit 10 seen from a lane direction.

FIG. 9 is a side view of the structure of the antenna unit 10 seen from the lane direction. As already explained, in the case 41 of the antenna unit 10, the antenna portions 46 as antenna retaining portions capable of protruding above the lane are provided at each of the upper, middle, and lower heights respectively. Protruding/retracting operations of the respective antenna portions 46 are controlled independently. In the example of FIG. 9, the antenna portion 46 at the lower height is in the protruding state. The respective antenna portions 46 are thus capable of taking at least two states, a retracted state inside the case 41 and a protruding state above the lane.

Figure 10A:
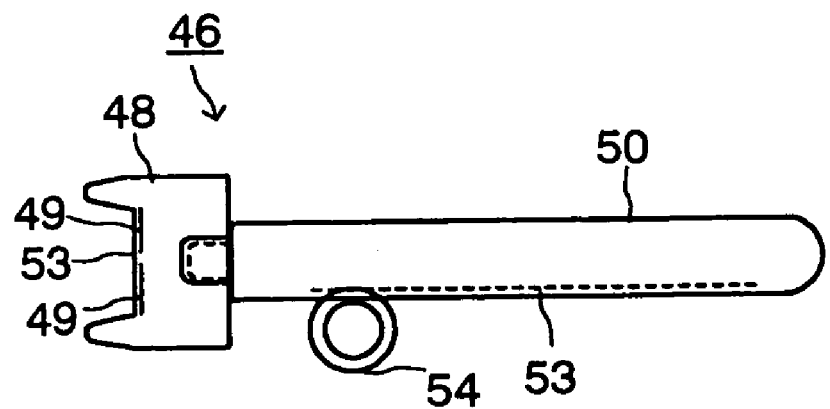
FIG. 10A is a side view showing the structure of an antenna portion 46 in FIG. 9.
Figure 10B:
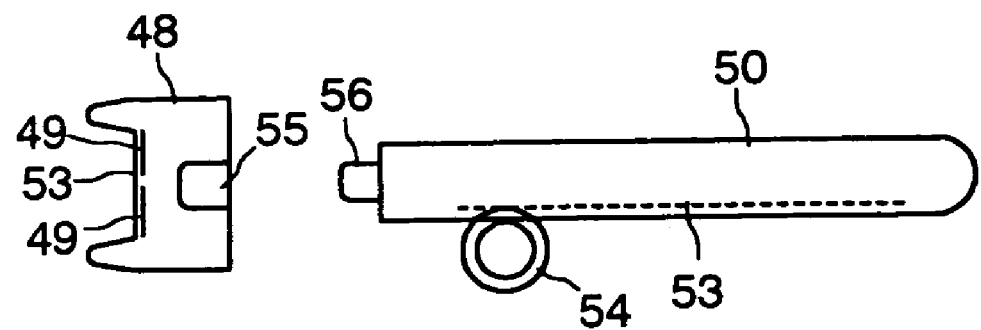
FIG. 10B is a side view showing a state that an antenna head portion 48 and an arm portion 50 of the antenna portion 46 are separated.

As shown in FIG. 10A and FIG. 10B, the antenna portion 46 is mainly constituted by an antenna head portion 48 equipped with antenna coils 49 and an arm portion 50 removably supporting the antenna head portion 48 at a tip thereof.

Figure 11:
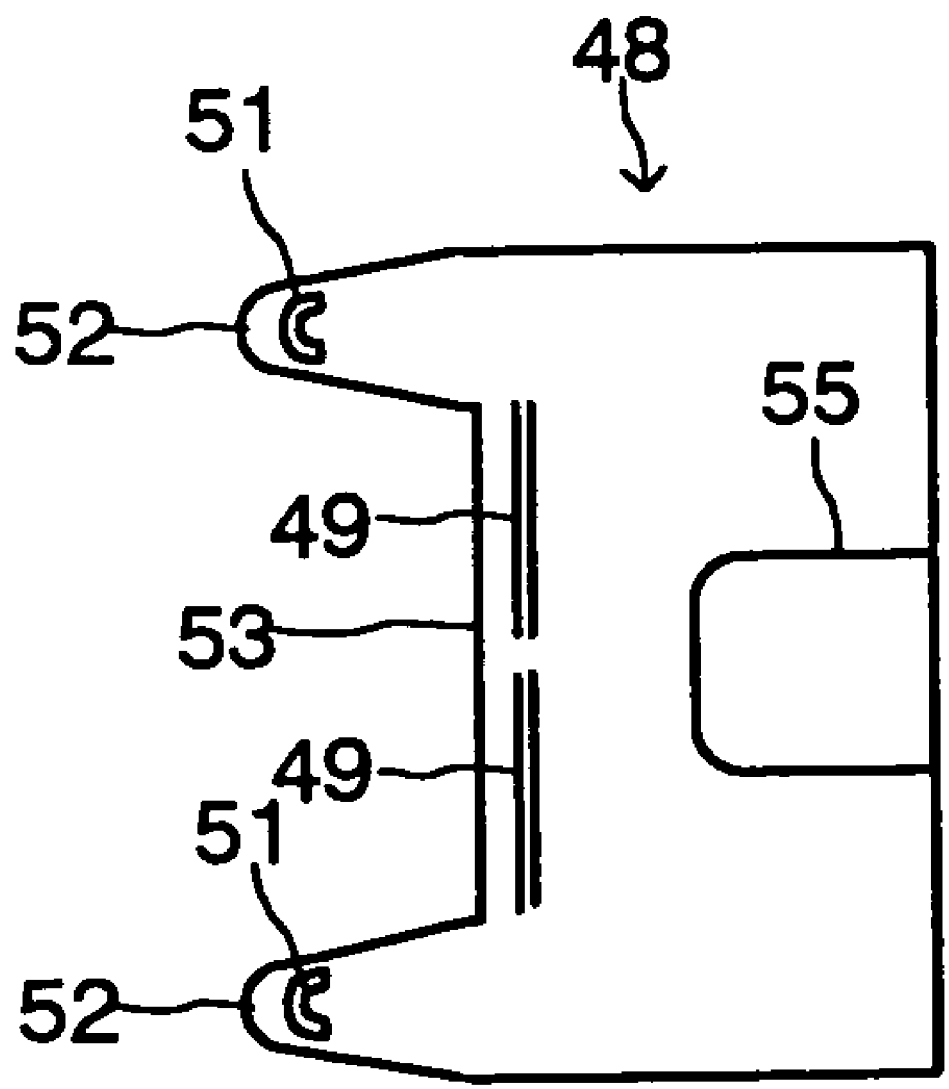
FIG. 11 is a detailed cross-sectional view of the antenna head portion 48 in FIG. 10A and FIG. 10B.

A detailed cross-section of the antenna head portion 48 is shown in FIG. 11. This antenna head portion 48 is manufactured using an elastic material such as rubber at the tip or on the whole thereof. On the tip of the antenna head portion 48, provided are protruding portions 52 each having a sensor 51 embedded therein so as to sense with high sensitivity a contact with a vehicle in case the contact happens while protruding. On the antenna head portion 48, these protruding portions 52 may be the only portions manufactured by elastic material. The aforementioned sensor 51 may be any sensor that is capable of detecting a contact with a vehicle 60. Specifically, a pressure sensor, a metal sensor or the like may be used.

Figure 17:
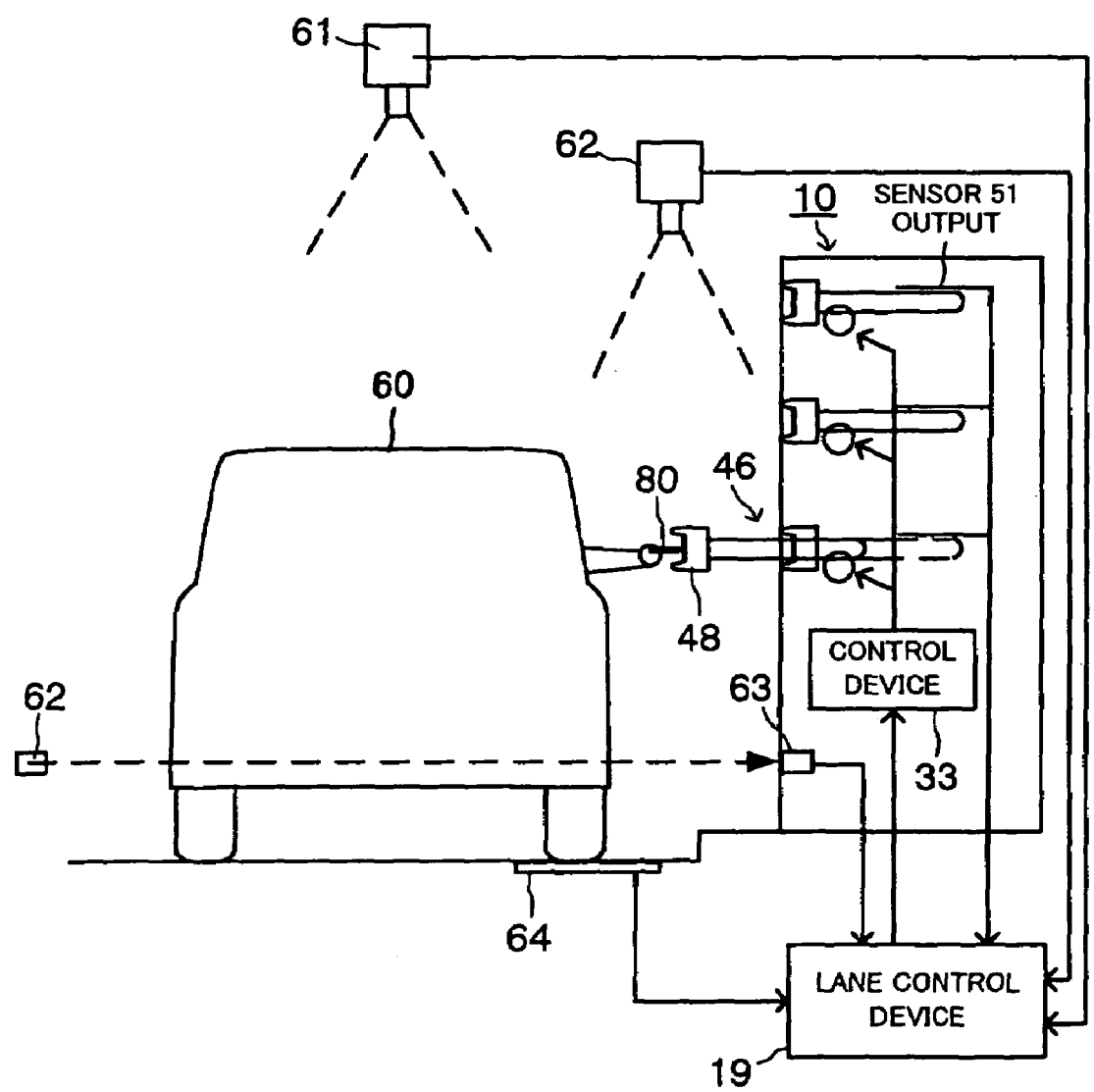
FIG. 17 is a view for illustrating a method for detecting a stopping of a vehicle 60.

As shown in FIG. 17, an output of the sensor 51 is notified to the lane control device 19. When a contact with or approximation to the vehicle 60 is detected by the sensors 51 provided in the protruding portions 52 in the middle of the protruding operation of the antenna portion 46, the lane control device 19 supplies a control signal to the control unit 33 in the antenna unit 10 so as to immediately stop the protruding operation and avoid the state in contact with/approximate to the vehicle 60 by performing a small retracting operation.

The aforementioned protruding portions 52 are provided on upper and lower end portions on the tip of the antenna head portion 48, and the tip of the antenna head portion 48 between the upper and lower protruding portions 52 is a vertical surface 53 facing the lane. Further, in the tip portion of the antenna portion 48, two antenna coils 49 and 49 (air-core coils) each formed by a linear conductor which is laid in a circle in a surface that is substantially parallel to the vertical surface 53 are aligned and arranged vertically. Details of these two antenna coils 49 and 49 are explained later.

On the other hand, a power transmission portion 53 such as a rack is provided on the arm portion 50 supporting the antenna head portion 48 on the tip thereof. A driving gear 54 is coupled to this power transmission portion 53, and forward/backward operation of the antenna head portion 48 to protrude/retract is performed by controlling the drive and rotating direction of this driving gear 54.

Figure 12A:
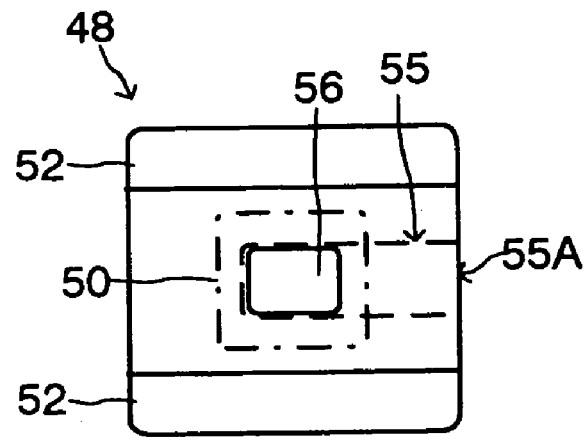
FIG. 12A, FIG. 12B and FIG. 12C are side views illustrating a movement of the antenna head portion 48 falling away by a push from side.
Figure 12B:
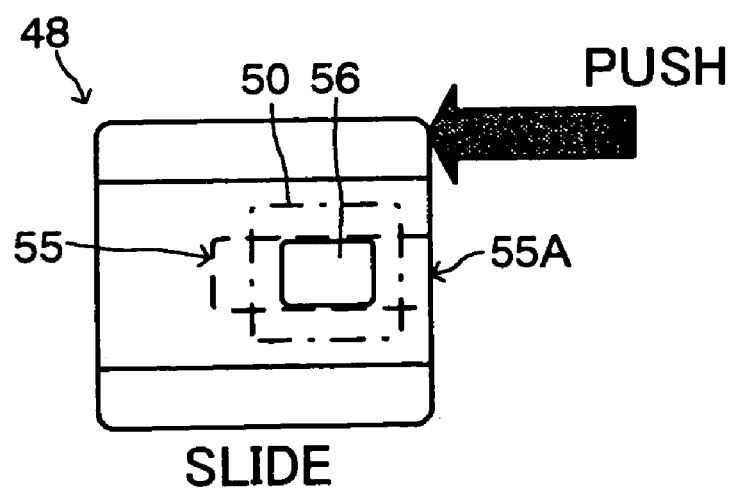
Figure 12C:
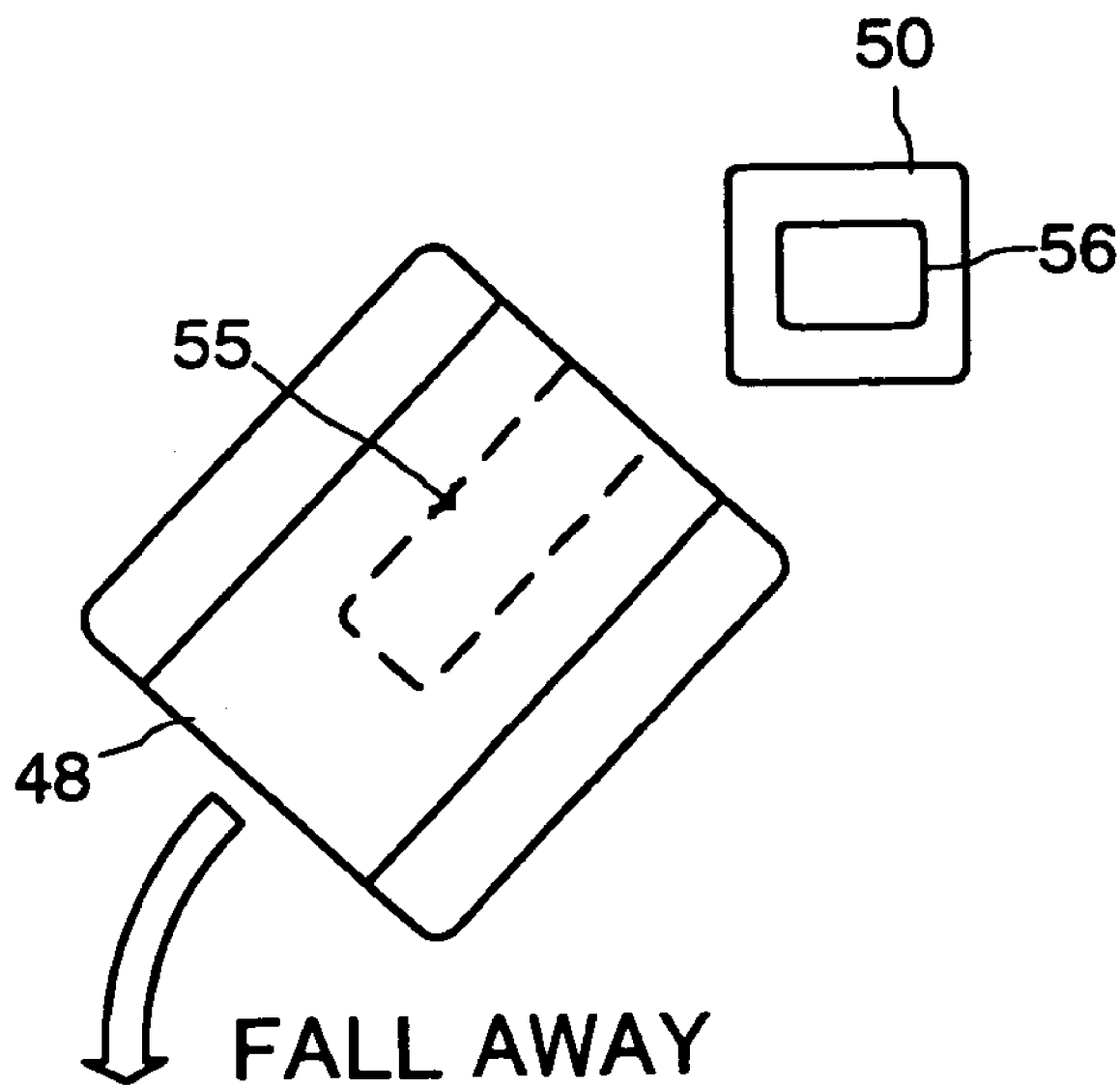

Further, the antenna head portion 48 is removably attached to the tip of the arm portion 50. More specifically, as shown in FIG. 12A, a horizontal slot 55 is formed on the backside of the antenna head portion 48, and a support protrusion 56 protruding in a horizontal direction from the tip of the arm portion 50 is inserted into the slot 55. The slot 55 formed on the backside of the antenna head 48 has an opening (opening 55A) on a reverse side of the traveling direction of a vehicle, and the support protrusion 56 can be inserted/removed through this opening 55A. Therefore, as shown in FIG. 12B, when the antenna head portion 48 comes in contact with the vehicle 60 and is pushed toward the vehicle traveling direction while the antenna portion 46 is protruding, the antenna head portion 48 slides in the pushing direction along the slot 55 of the antenna head portion 48 as shown in FIG. 12C and finally falls away from the tip of the arm portion 50. Thus, breakage of the antenna head portion 48, the antenna portion 46, the antenna unit 10 and the like can be prevented when in contact with a vehicle.

Next, the two antenna coils 49 embedded in the antenna head portion 48 are explained in detail.

Figure 13:
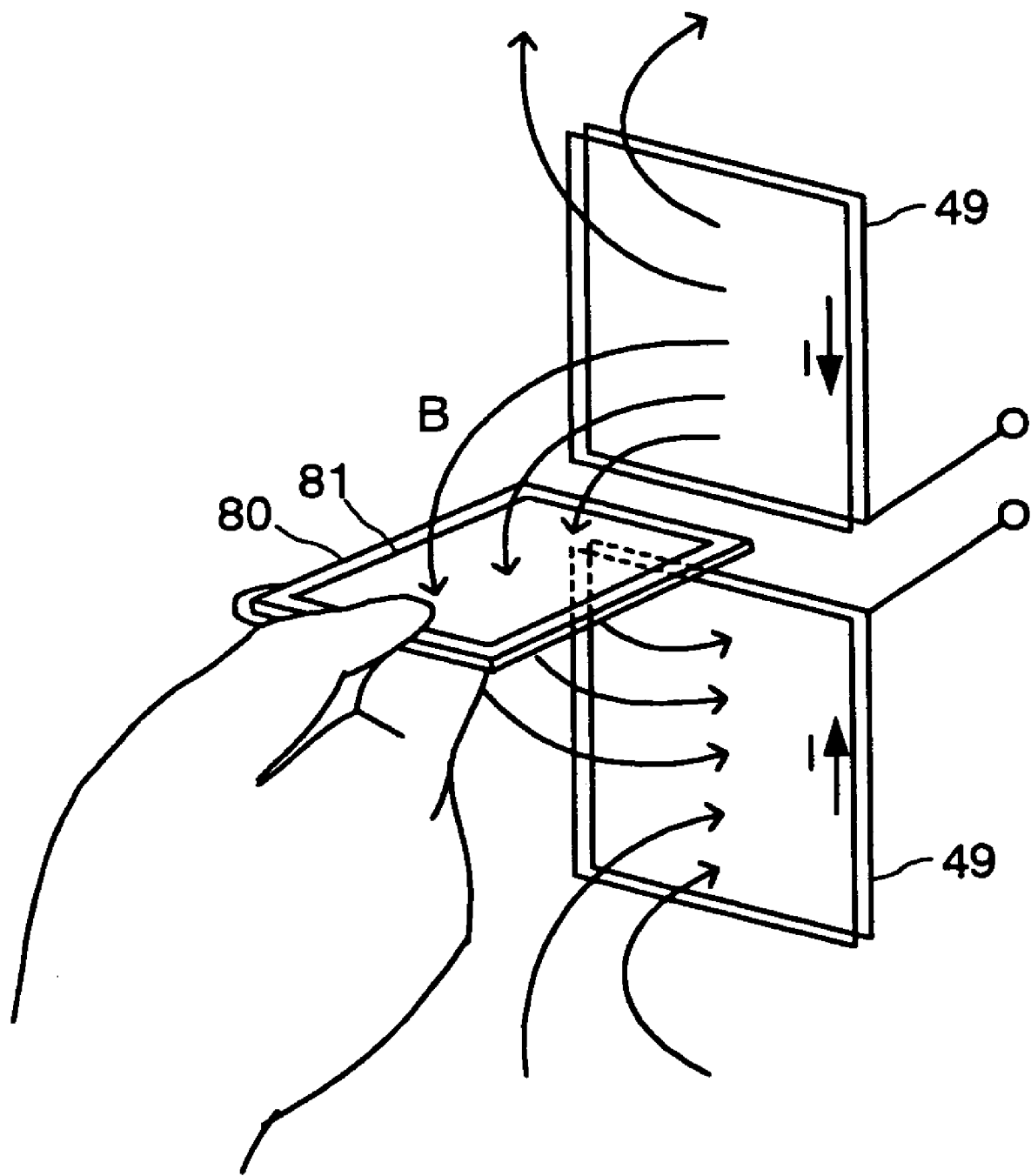
FIG. 13 is a perspective view showing the structure of antennas of the antenna head portion 48.
Figure 14:
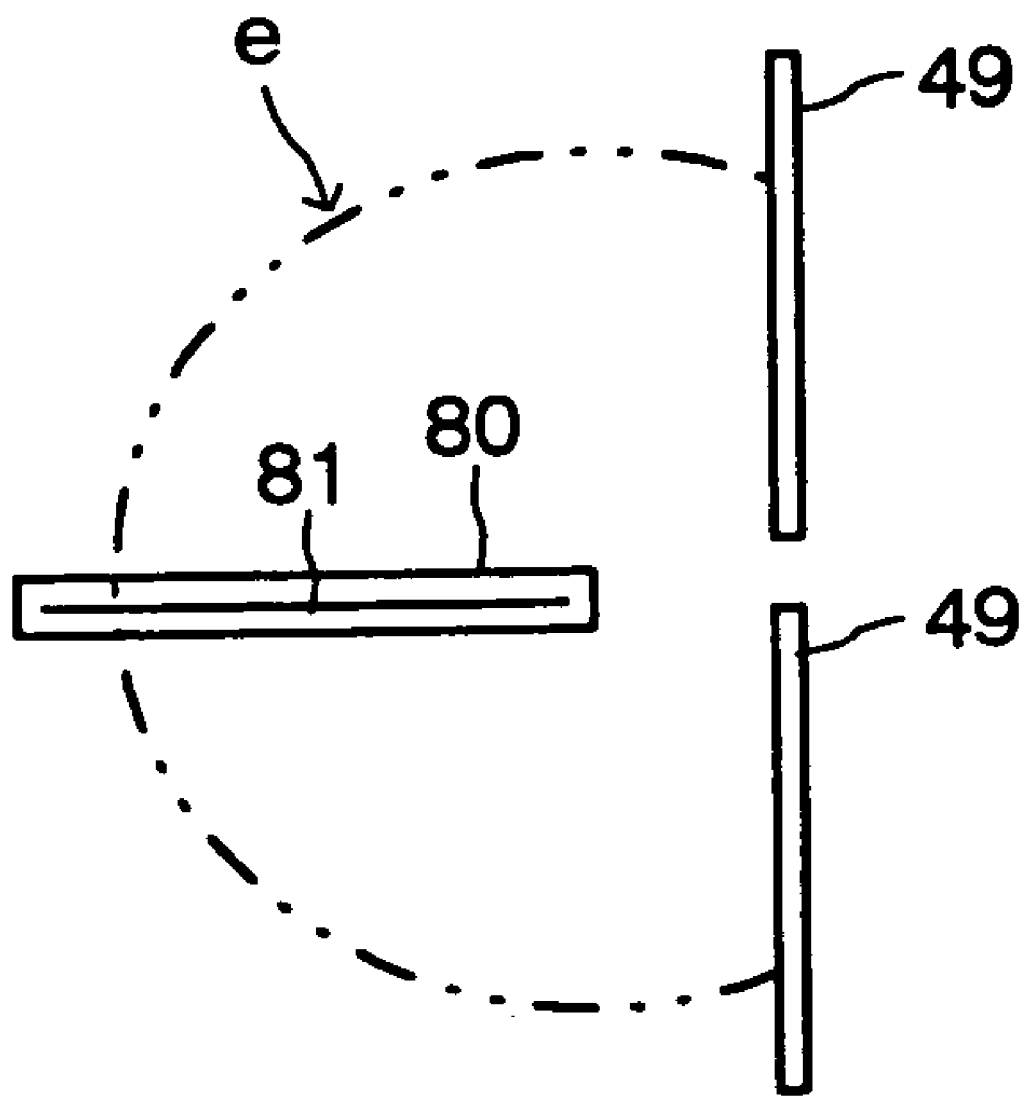
FIG. 14 is a view showing a directivity of the antennas in FIG. 13.

FIG. 13 shows a state of magnetic flux B formed by the two antenna coils 49 and 49. As described above, in the tip portion of the antenna head portion 48, plural, for example, two antenna coils 49 and 49 (air-core coils) are aligned vertically and arranged in proximity to each other, each formed by winding a linear conductor in the surface substantially parallel to the vertical surface 53 of the tip thereof. Winding directions of the respective antenna coils 49 and 49 are reverse to each other. When currents I are passed respectively through the antenna coils 49 in directions shown in the view, the magnetic flux B having a high density is generated in a direction perpendicular to the front sides of the respective antenna coils 49 and 49, namely, the front side of the antenna head portion 48, so that the antenna head portion 48 has an antenna directivity e as shown in FIG. 14.

On the other hand, in the IC card 80, an air-core coil 81 formed by a linear conductor which is laid in a circle in a direction substantially parallel to a main surface thereof is embedded. When this IC card 80 is directed to the vertical surface 53 of the antenna head portion 48 and moved closer thereto in a horizontal posture such that the main surfaces of the IC card face upward/downward, the density of the magnetic flux in a vertical direction passing through the air-core coil 81 of the IC card 80 increases and the antenna coils 49 and 49 of the antenna head portion 48 are electromagnetically coupled in an efficient manner to the air-core coil 81 of the IC card 80, so that a large mutual inductance is ensured to improve power transmission efficiency. Thus, excellent communication is realized. Moreover, in this embodiment, similarly to general card reading devices which read magnetic cards, the IC card 80 is only needed to be held out toward the antenna unit 10 with a posture such that the main surfaces of the IC card 80 face upward/ downward, which contributes to reduce confusion of the driver of a vehicle when holding out the IC card 80.

Figure 15:
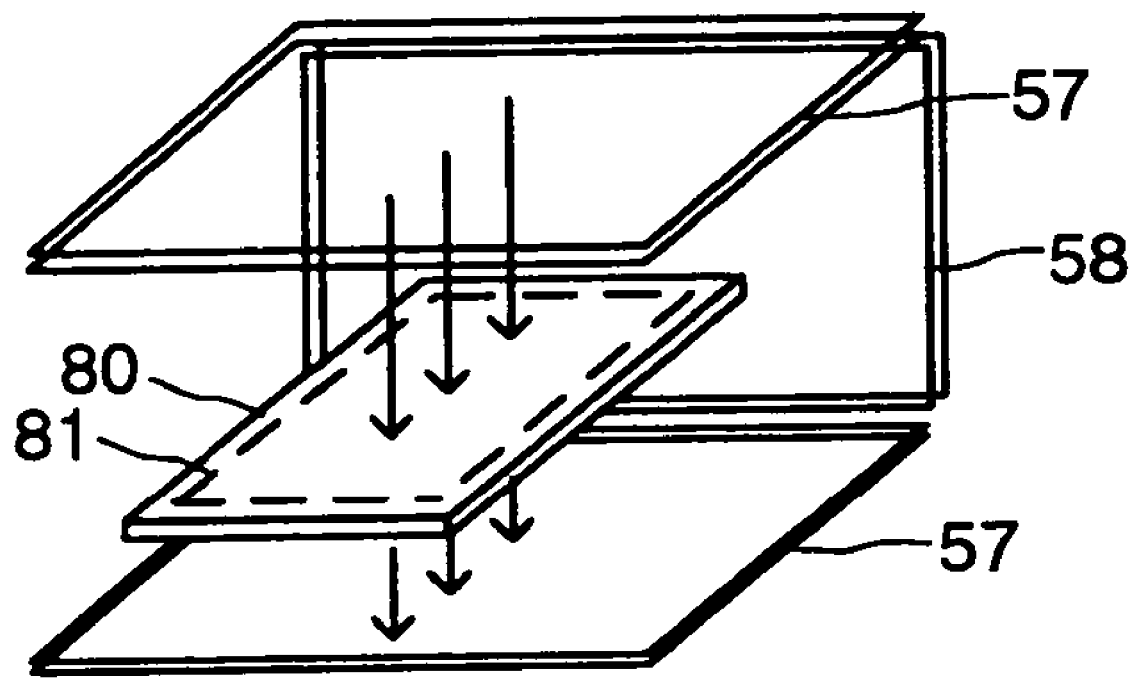
FIG. 15 is a perspective view showing the structure of another antenna of the antenna head portion 48.
Figure 16:
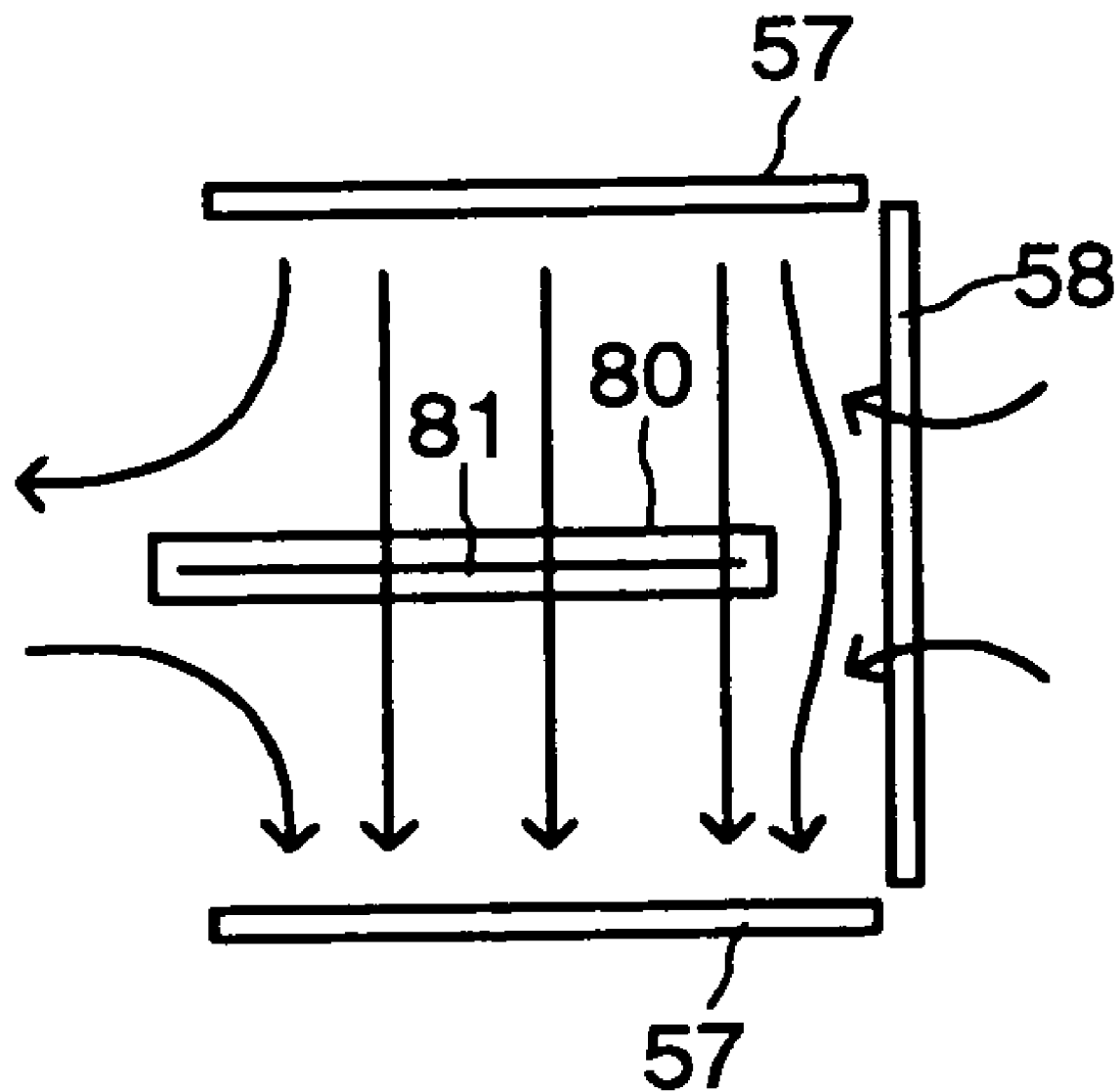
FIG. 16 is a side view showing directions of magnetic flux generated by the antennas in FIG. 15.

Further, as shown in FIG. 15 and FIG. 16, there is also a method in which two first antenna coils 57 and 57 having the same winding direction are provided apart to each other and arranged opposite to each other in a substantially horizontal direction, and a second antenna coil 58 is arranged in a vertical direction so as to cover one side of a space between these two first antenna coils 57 and 57. By thus combining the three antenna coils 57, 57 and 58, the magnetic flux having the vertical direction can be generated extensively in high density between the two antenna coils 57 and 57 arranged opposite to each other. Thus, by arranging the IC card 80 in the horizontal direction between the two antenna coils 57 and 57 arranged opposite to each other, the efficient electromagnetic coupling between the antenna coils 57 and 57 of the antenna head portion 48 and the air-core coil 81 in the IC card 80 can be realized.

Figure 23A:
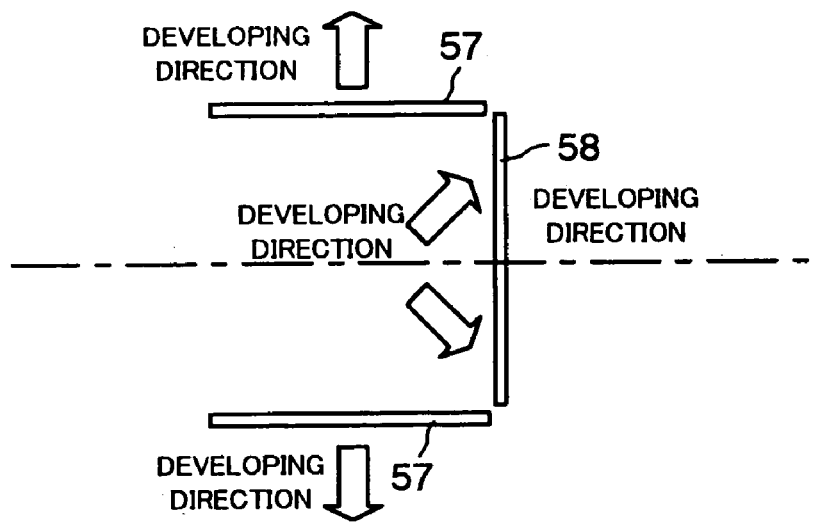
FIG. 23A and FIG. 23B are connection diagrams of two first antenna coils 57 and 57 with a second antenna coil 58 in FIG. 16.
Figure 23B:
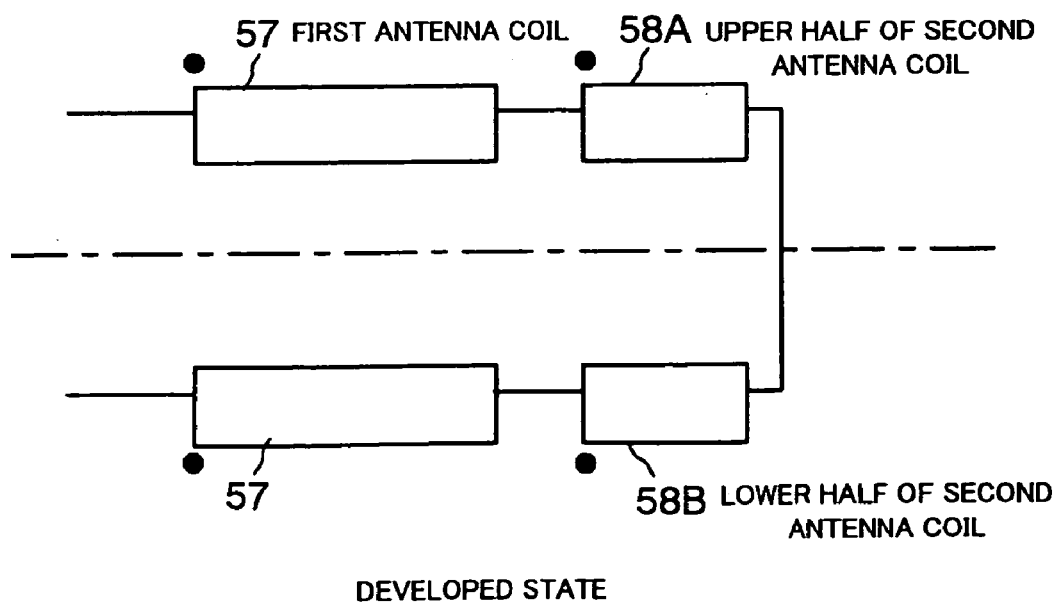

FIG. 23B is a connection diagram of the two first antenna coils 57 and 57 and the second antenna coil 58. The two first antenna coils 57 and 57 are wound in reverse directions to each other in a state that they are developed in developing directions of FIG. 23A, and when the respective antenna coils 57, 57 and 58 are in a three-dimensionally combined state, the two first antenna coils 57 and 57 have a common winding direction. The second antenna coil 58 is divided into two, top and bottom, to be wound, and respective winding directions of these divided second antenna coils 58A and 58B are reverse to each other. The magnetic flux generated by these divided second antenna coils 58A and 58B cancels the magnetic flux in a region approximate to the second antenna coil 58 in the magnetic flux formed between the two first antenna coils 57 and 57, so that the magnetic flux in the vertical direction can be extensively generated between the two antenna coils 57 and 57 arranged opposite to each other.

Next, a timing of protruding operation of the antenna portion 46 of the antenna unit 10 will be explained.

Regarding the timing to start the protruding operation of the antenna portion 46, the timing when the vehicle 60 stops and the timing when the driver of a vehicle holds out his/her IC card 80 is considered to be ideal.

First, a method for detecting the stop of the vehicle 60 will be explained. As shown in FIG. 17, a camera 61 that picks up an image of the vehicle 60, for example, from above is provided and a motion in the image picked up by this camera 61 is detected, and when the motion no longer exists, it is judged that the moving body does not exist on the lane. The stop of a vehicle is detected by fulfillment of both the conditions that the moving body does not exist and that the vehicle 60 exists on the lane. Methods for detecting the existence of the vehicle 60 include a method in which a light emitter 62 and a light receptor 63 both constituting a light sensor are arranged on the both sides with the lane intervening therebetween and the vehicle is detected from a coupling state of the light between the light emitter 62 and the light receptor 63, a method using a metal sensor (not shown), and the like. Further, another method for detecting that the moving body does not exist is arranging a pressure sensor 64 on the road surface and judging that the moving body does not exist when there is no change in detected pressure.

Next, a method for detecting the holding out of the IC card 80 by the driver of a vehicle will be explained. To detect the holding out of the IC card 80 by the driver of a vehicle, there is a method in which a camera 62 which picks up an image between the antenna unit 10 and the vehicle 60 is arranged, for example, at an upper position, and an extension of an arm from the vehicle 60 is recognized by an image processing.

Figure 18:
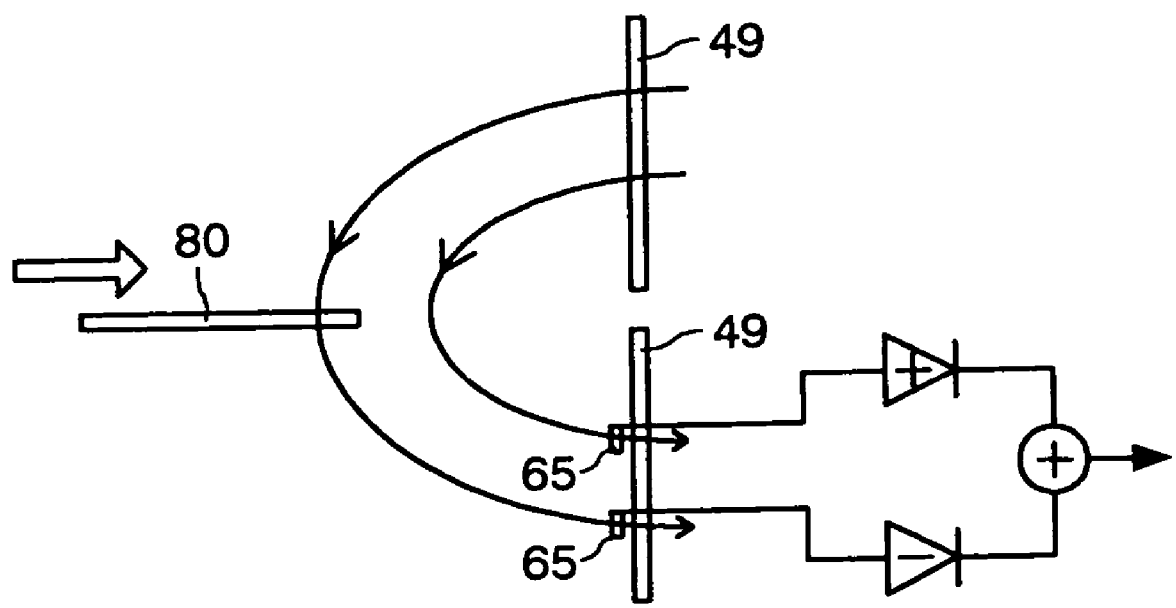
FIG. 18 is a view showing a method for detecting an approach of an IC card 80 to the antenna head portion 48 using differential coils 65.

Further, there is a method in which a magnetic field detecting means is provided in the vicinity of the antenna coils 49 and 49 of the antenna head portion 48, and a state that the coil of the IC card 80 enters a magnetic field formed by the antenna coils 49 and 49 and is electromagnetically coupled thereto is detected by the magnetic field detecting means, thereby detecting an approach of the IC card 80 to the antenna head portion 48. As the magnetic field detecting means, as shown in FIG. 18, there is a method in which the magnetic field in a space is extensively detected by differential coils 65, and a magnetic field disturbance by the approach of the IC card 80 is detected.

Next, communication control of the upper, middle, and lower antenna portions 46 in the antenna unit 10 will be explained.

Figure 19:
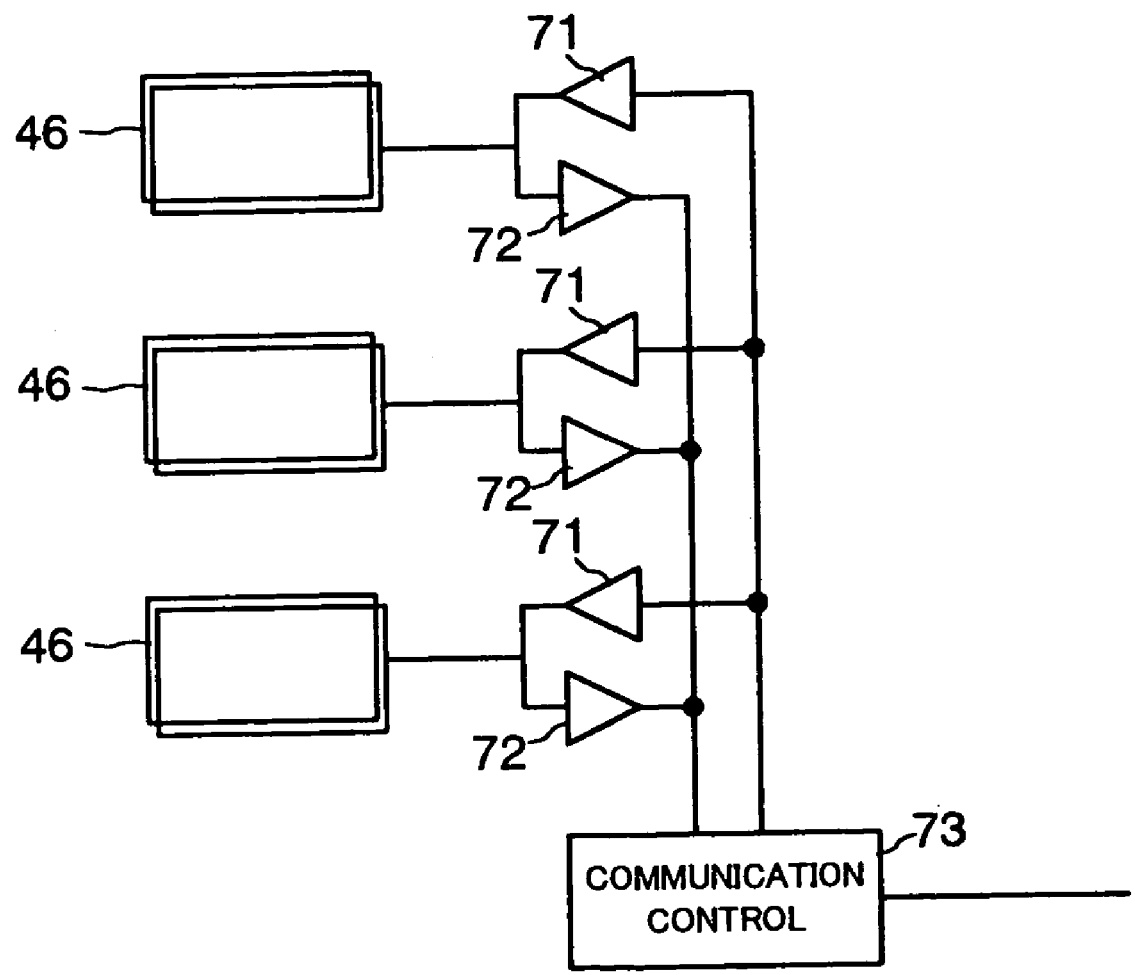
FIG. 19 is a block diagram illustrating a communication control system of respective antenna units.

As shown in FIG. 19, transmitters 71 and receivers 72 of the antenna portions 46 are controlled by a communication control unit 73. Here, when the coil 81 of the IC card 80 is electromagnetically and simultaneously coupled to the antenna coils 49 of the plural antenna portions 46, a communication problem may occur due to interference between the antenna portions 46, to incapability to obtain a sufficient receive output, and the like. Then, the communication control unit 73 controls the transmitters 71 and the receivers 72 of the antenna portions 46 so that only one communication performed through any one of the antenna portions 46 among the respective antenna portions 46 becomes active.

Methods for selecting the antenna portion 46 whose communication is to be activated include a method which operates the respective antenna portions 46 for a definite period of time to detect respective electromagnetic field intensity of communication and deactivates the communication except the one that provides the most stable communication electromagnetic field intensity, and a method that processes communication of the respective antenna portions 46 in time division and activates only the antenna portion to which a communication link is made first. Further, another method can be considered in which, after determining at first the active antenna portion by the latter method, the electromagnetic field intensity of communication of the respective antenna portions 46 is monitored by the former method so as to successively switch to the optimum antenna portion.

Figure 20:
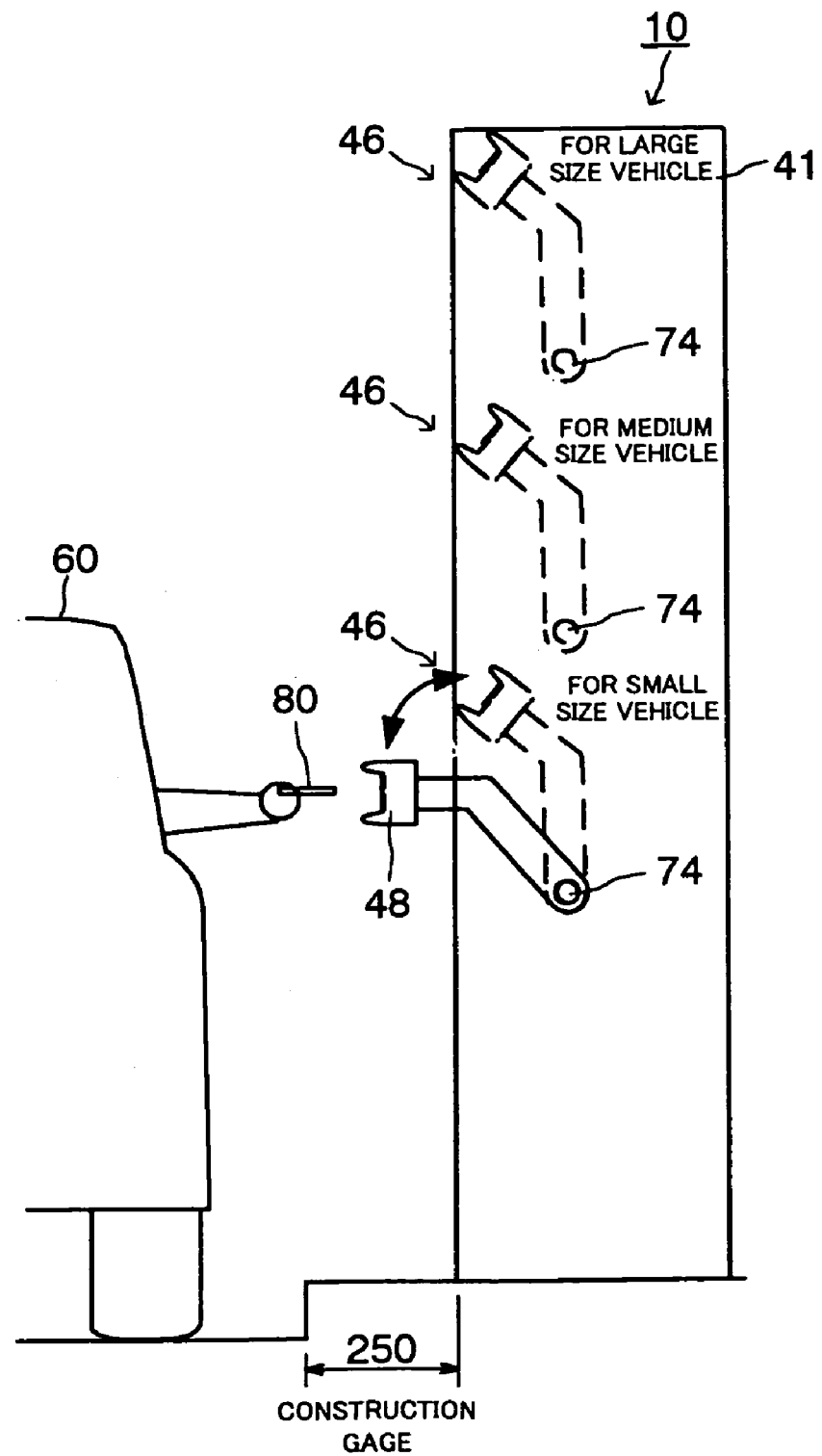
FIG. 20 is a side view of another antenna protruding mechanism in the antenna unit 10 seen from the lane direction.

FIG. 20 is a side view showing another embodiment of the protruding mechanism of the antenna portions 46 of the antenna unit 10. The protruding mechanism of this example is structured to allow a free rotation of the antenna portion 46 with a shaft 74 as the fulcrum by releasing potential energy so as to make the antenna head portion 48 protrude above the lane. Retraction from the state protruding above the lane to inside of the unit 10 is performed by a drive mechanism that is not shown.

Figure 21:
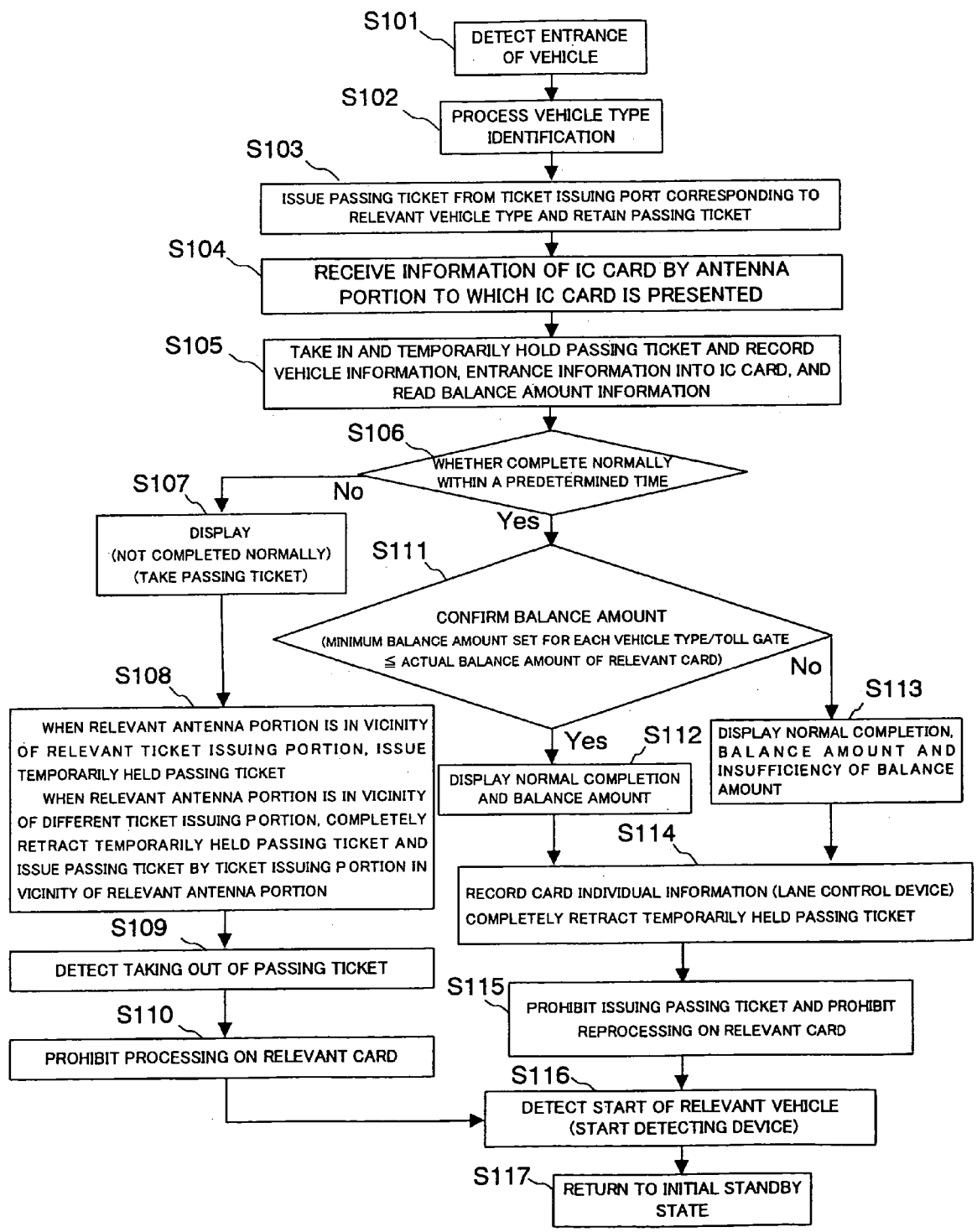
FIG. 21 is a flow chart showing a flow of an entrance processing.

Next, an example of operation of the entrance processing in this toll collecting system will be explained with reference to the flow chart in FIG. 21.

In a tollgate that is the entrance of a toll road, when a vehicle enters a lane that is for performing processings for the vehicle regarding utilization, for example, the entrance processing including a processing to write entrance information into the IC card and the like, namely, the entrance lane, the vehicle type identifying device 12 detects the entrance (S101), identifies the vehicle type from vehicle information such as the number of axles, vehicle height, vehicle length, license plate and the like of the entering vehicle (S102), and notifies the vehicle information to the lane control device 19. By this notification, the lane control device 19 gives an instruction to the device that is to issue a ticket, namely, the automatic passing ticket issuing device 24 or the ticket issuing device 14 for left-hand drive vehicles. Incidentally, when the lane control device 19 judges to issue the passing ticket at the middle and upper heights from the notified vehicle information, it instructs only the automatic passing ticket issuing device 24 to issue the passing ticket, and when it judges to issue the passing ticket at the lower height, it instructs the corresponding automatic passing ticket issuing device 24 or ticket issuing device 14 for left-hand drive vehicles to issue the passing ticket. Thus, the automatic passing ticket issuing device 24 or the like for example issues the passing ticket from the ticket issuing port of the ticket issuing portion 45 at the height corresponding to the vehicle type of the relevant vehicle, and retains the passing ticket at a position where the front end of the passing ticket protrudes by a predetermined length from the ticket issuing port of the ticket issuing portion 45 (S103).

When using the IC card instead of the passing ticket, the user who is the driver of the vehicle, instead of taking the passing ticket that is issued from the ticket issuing portion 45 at the middle height of the automatic passing ticket issuing device 24, presents the IC card in a posture that both the main surfaces of the IC card face upward/downward toward any of the antenna portions 46, which is the closest to the user himself/herself, of the nearby antenna unit 10. At this moment, the stopping of vehicle or the holding out of IC card by the driver of the vehicle is detected by the above-described respective detecting means, which makes the antenna portion 46 protrude toward the lane side, so that the driver of the vehicle can easily present the IC card inside the communication distance of the antenna portion 46.

The respective antenna portions 46 of the antenna unit 10 constantly transmit radio waves, and when the IC card is presented, they start wireless communication with the IC card and receive card information from the IC card (S104). At this moment, for example, a system that activates only the communication of one antenna portion 46 that provides the most stable communication electromagnetic field intensity, or a system that processes the communication of respective antenna portions 46 in time division and activates only the antenna portion 46 to which a communication link is made first is employed to electromagnetically couple the coil of the IC card to only the antenna coils of one antenna portion, to thereby allow more stable communication.

When the card information is received, the antenna unit 10 notifies the lane control device 19 that a card processing (antenna processing) starts by the antenna portion 46. The card processings (antenna processings) include processings such as confirming whether the card information obtained from the IC card is normal or not, recording vehicle information, vehicle type information and entrance information into the IC card when the card information is normal, confirming a reading of balance amount information, and the like. In the card processing when the card information is normal, the vehicle information (license plate number), vehicle type information (number information indicating standard-sized vehicle) and entrance information (tollgate number, lane number, time of passing the entrance and so on) and the like are transmitted from the antenna portion 46 to the IC card and recorded therein.

The lane control device 19 instructs the automatic passing ticket issuing device 24 to perform an antenna processing so that the automatic passing ticket issuing device 24 takes back the passing ticket, which is being issued and retained, into the ticket issuing port of the ticket issuing portion 45 and temporarily holds (retracts) it. In the meantime, the antenna portion 46 continues the card processing (S105).

When the card processing is not completed normally within a preset time (NO at S106), the lane control device 19 issues instructions to the roadside display device 15 and the automatic passing ticket issuing device 24. The roadside display device 15 displays that the passing ticket should be taken because the card processing is not completed normally (S107). Further, the automatic passing ticket issuing device 24 issues the temporarily held (retracted) passing ticket to the relevant vehicle (S108).

When the automatic passing ticket issuing device 13 detects by an internal sensor that the passing ticket is taken out (S109), the lane control device 19 prohibits processings on an IC card (S110) so as not to accept any processing of the IC card.

On the other hand, when the card processing is completed normally within the preset time (YES at S106), the lane control device 19 then performs a confirmation processing of a balance amount (S111). The confirmation processing of a balance amount is performed by comparing the actual balance amount obtained from the IC card with the minimum balance amount that is preset for each vehicle type/tollgate.

After the confirmation processing of the balance amount is performed, when the resulting balance amount is normal (YES at S111), the lane control device 19 displays on the roadside display device 15 that the card processing is completed normally, and displays the balance amount (S112). In case that the amount of balance is less than the amount preset for each vehicle type/tollgate, it also displays that the balance amount is insufficient (S113).

The lane control device 19 records individual information of the IC card in its memory and instructs the automatic passing ticket issuing device 13 to retract an unnecessary passing ticket, so that the temporarily held passing ticket for the pertinent vehicle is completely retracted as an unnecessary passing ticket (S114).

Furthermore, the lane control device 19 issues to the automatic passing ticket issuing device 13 and the ticket issuing device 14 for left-hand drive vehicles an instruction to prohibit issuing a passing ticket and an instruction to prohibit reprocessing of the IC card (S115), so that the temporarily held passing ticket for the relevant vehicle is completely retracted as an unnecessary passing ticket.

Subsequently, when the start detecting device 16 detects a start of the relevant vehicle and the vehicle type identifying device 12 detects entrance of a following vehicle (S116), the lane control device 19 resets its processing to the initial standby state (S116), and restarts accepting a processing of IC card (S117).

Figure 22:
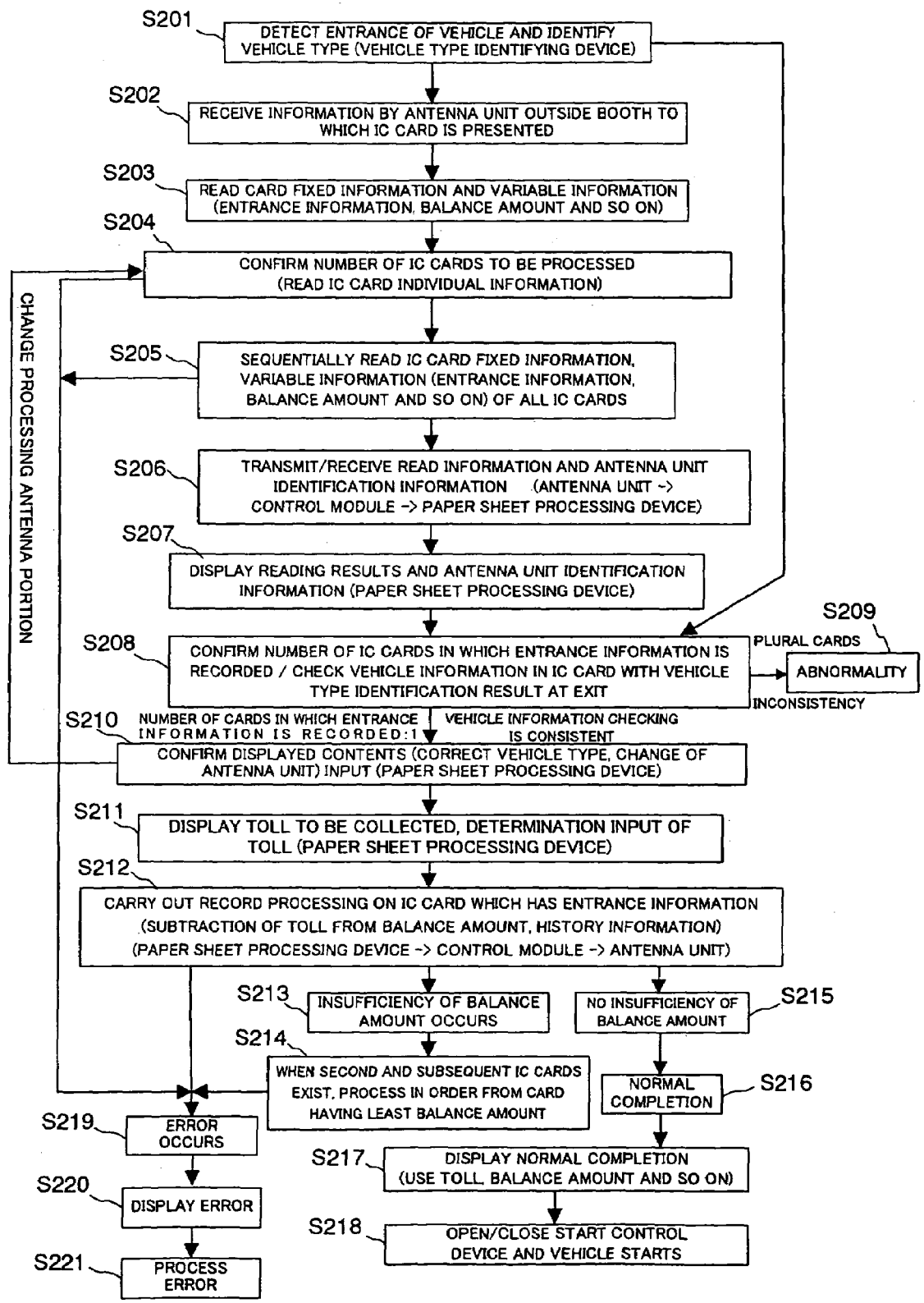
FIG. 22 is a flowchart showing a flow of an exit processing.

Next, an example of operation of the toll collection processing at an exit will be explained with reference to the flow chart in FIG. 22.

At a tollgate which is an exit of a toll road, on a lane for performing processings for the vehicle regarding utilization, for example, reading card information including entrance information from an IC card and performing the toll collection processing of a toll road, namely, an exit lane, processing states(standby state, card processing standby state, middle of processing, processing result, and the like) of the respective antenna units 20 and 21 are constantly notified to the lane control device 29, and then notified from its control module 28 to the paper sheet processing device 24 (S201).

Under such a condition, when a vehicle exiting from the toll road enters the exit lane, the vehicle type identifying device 22 detects the entrance of the vehicle and identifies a vehicle type (S202), and the lane control device 29 starts an exit processing.

When the vehicle type identifying device 22 detects the vehicle, the lane control device 29 first operates the antenna unit 20 or the antenna unit 21 for performing a card processing and activates the card processing function.

After the vehicle enters the lane, the driver of the vehicle who stops the vehicle at the position of the antenna units 20 and 21 presents at least one IC card through a window toward a nearby antenna portion 36 in a posture that the main surfaces of the IC card face upward/downward. At this moment, the stopping of the vehicle or holding out of the IC card by the driver of the vehicle is detected by the above-described respective detecting means, which makes the antenna portion 36 protrude toward the lane side, so that the driver of the vehicle can easily present the IC card inside the communication distance of the antenna portion 36.

The respective antenna portions 36 of the antenna unit 20 constantly transmit radio waves, and when the IC card is presented, they start wireless communication with the IC card and receive card information in order from the first IC card (S202). At this moment, for example, a system that activates only the communication of one antenna portion 36 that provides the most stable communication electromagnetic field intensity, or a system that processes the communication of the respective antenna portions 36 in time division and activates only the antenna portion 36 to which a communication link is made first is employed to electromagnetically couple the coil of the IC card only to the antenna coils of one antenna portion 36, to thereby allow more stable communication.

The antenna unit 20 reads fixed information such as card individual information of the IC card, and variable information such as entrance information including vehicle type information and prepaid balance amount information and the like (S203), and confirms the number of IC cards to be processed from the number of read IC card individual information (S204). In other words, it confirms how many IC cards should be processed. After the number of cards to be processed is confirmed, the antenna unit 20 reads, in order, the IC card fixed information, variable information and the like of all the IC cards (S205), and sends the confirmation results (read information) through the control module 28 of the lane control device 29 to the paper sheet processing device 24 (S206).

At this time, when the reading results (read information) such as the IC card fixed information, the variable information (vehicle type information/entrance information) and the like of all the IC cards are received from the antenna unit 20, the control module 28 sends a toll to be collected, which is calculated from the reading results (read information) and a toll table that is set in itself, together with information (antenna unit identification information) for identifying the antenna unit performing the processing (whether the antenna unit 20 or 21) to the paper sheet processing device 24 (S206).

When the reading results (read information) of the IC card are received, the paper sheet processing device 24 displays the reading results (read information), the toll to be collected, and the antenna unit identification information on a display portion (S207).

Further, the control module 28 checks the vehicle information recorded in the IC card with the result of the vehicle type identification processing at the exit (S208) to confirm consistency. Incidentally, when the result of the reading indicates that the entrance information is recorded on plural IC cards, or when inconsistency is confirmed from the result of the checking of the vehicle information, there is a possibility that an unauthorized activity is performed such as exchanging IC cards between different vehicles or the like, so that an abnormality processing is performed (S209). The abnormality processing is, for example, a processing such as displaying individual information of the inconsistent IC card on the display portion, notifying a clerk by a voice message, or the like.

When the display of the reading results and the toll to be collected on the paper sheet processing device 24 is completed, the clerk confirms the vehicle type of the vehicle to which the processing is performed by the relevant antenna unit and the displayed contents (S210). Thereafter, the clerk confirms the displayed contents on the display portion of the paper sheet processing device 24 and performs determination input of the toll (S211), and when the toll is determined, the control module 28 instructs the relevant antenna unit 20 to record information after subtraction of the toll and history information of the toll collection processing. According to this instruction, the antenna unit 20 starts a subtraction processing of the toll from the IC card in which the entrance information is recorded. Here, in case that the collected amount is insufficient even when the entire balance amount is subtracted from the first IC card, the toll subtraction processing is carried out in order from the card, out of second and subsequent cards, having the least balance amount, until the toll collection is completed.

In the toll subtraction processing, recording of necessary information (balance amount information after the subtraction from the balance amount and the history information of a toll collection processing) is performed on the IC card that stores the card information including the entrance information (S212). Incidentally, while performing the series of toll collection processings, the display portion 37 of the antenna unit 20 displays that the processing is in progress.

For example, when insufficiency of balance amount occurs in the subtraction processing on a first IC card (S213), and if a second IC card exists, the control module 28 instructs the antenna unit 20 to carry out the subtraction processing in order from the card having the least balance amount (S214). Further, when no insufficient balance amount exists (S215), and the toll collection is completed normally (S216), the display portion 37 in the vicinity of the antenna portion 36 or the display device 23 for users displays that the toll collection is completed normally, as well as the toll, the balance amount and the like (S217).

After the normal completion, the lane control device 29 opens blocking bars 27A and 27B of the start control device 27 and permits passing of the relevant vehicle. Accordingly, the vehicle starts proceeding, and at the time when the passing of the vehicle is detected by the start detecting device 26, the lane control device 29 closes the blocking bars 27A and 27B of the start control device 27 (S218).

When an error occurs in any processing in the above-described step S204, step S205, step S212, and step S214 (S219), a relevant display portion displays the occurrence of the error (S220) and an error processing is performed (S221).

Further, when the vehicle type identifying device 22 detects entrance of a subsequent vehicle, the lane control device 29 starts accepting a processing of IC card for the subsequent vehicle.

During the above-described protruding operation of an antenna portion (for example, the antenna unit 46) of an antenna unit (for example, the antenna unit 10) in processings at the entrance and the exit, when the protruding portions 52 on the tip of the antenna head portion 48 come in contact with or become close to a vehicle, it is sensed by the sensors 51 attached on the protruding portions 52 of the antenna head portion 48 and notified to a control unit 70 in the antenna unit 10. When the control unit 70 receives this notification, it immediately stops the protruding operation, performs a small retracting operation and performs a processing of avoiding the state in contact with/proximity to the vehicle 60.

The embodiments of the present invention have been described above, but the present invention is not limited to the above-described embodiments, and as a matter of course the various changes may be added within a range not departing from the spirit of the present invention.

As has been described above, according to the first embodiment of the present invention, the distance between the driver of a vehicle and the antenna coils is shortened and the user can present the IC card inside the communication range of the antenna without any difficulty. According to the second embodiment, the level of damage due to the contact of the antenna retaining portion with a vehicle, which is conceivable to occur when the antenna retaining portion protrudes above the lane, can be decreased. According to the third embodiment, breakage can be prevented when the vehicle comes in contact with the antenna head. According to the fourth, fifth, nineteenth and twentieth embodiments, an efficient electromagnetic coupling of the antenna coils to the coil inside the IC card becomes possible, which allows stable communication. According to any one of the sixth to ninth embodiments and to any one of the sixteenth to eighteenth embodiments, communication problems arising from the simultaneous electromagnetic coupling of the coil in the IC card to the antenna coils of the plural antenna retaining portions can be eliminated. According to any one of the tenth to fifteenth embodiments, the antenna retaining portion can protrude above the lane at a safe timing.

It should be understood that the present invention is not limited to the specific forms described above with illustration and all the changes which come within the range of equivalency of the following claims are therefore intended to be embraced therein.

What is claimed is:

1. An antenna unit installed on a roadside portion of a lane where a processing regarding use of a toll road is performed for a vehicle passing through the toll road, the antenna unit comprising:
   an antenna retaining portion retaining in a tip portion thereof an antenna coil configured to perform wireless communication with an IC card through an electromagnetic coupling; and
   a drive mechanism configured to freely move said antenna retaining portion backward and forward between a position where said antenna retaining portion protrudes above the lane and a position where said antenna retaining portion is retracted in said unit.

2. An antenna unit as set forth in claim 1, further comprising:
   a sensor configured to sense that the tip portion of said antenna retaining portion comes in contact with or approaches the vehicle; and
   a control unit configured to control said drive mechanism to stop movement of said antenna retaining portion when a contact with or an approach to the vehicle is sensed by said sensor while said antenna retaining portion is moved by said drive mechanism from the retracted position in said unit to the protruding position above the lane.

3. An antenna unit as set forth in claim 1,
   wherein said antenna retaining portion are further separable into an antenna head portion equipped with the antenna coil and a support portion supporting the antenna head portion on a tip thereof; and
   wherein the antenna head portion is mounted to be removable from the support portion by a push from a vehicle traveling direction on the lane.

4. An antenna unit as set forth in claim 1,
   wherein said antenna retaining portion retains two antenna coils in the tip portion thereof; and
   wherein the two antenna coils are respectively wound along a substantially vertical surface, and vertically aligned and arranged in proximity to each other in the tip portion of said antenna retaining portion.

5. An antenna unit as set forth in claim 1,
   wherein said antenna retaining portion comprises on the tip portion thereof:
   two first antenna coils wound respectively along a substantially horizontal surface and arranged separately and opposite to each other; and
   a second antenna coil arranged to cover substantially one side of a space between the two first antenna coils and to be wound along a substantially vertical surface.

6. An antenna unit as set forth in claim 1,
   wherein said antenna unit comprises a plurality of said antenna retaining portions; and
   wherein each of said plural antenna retaining portions moves independently forward and backward between the position where said antenna retaining portion protrudes above the lane and the position in said unit.

7. An antenna unit as set forth in claim 6, further comprising:
   a plurality of transmitters and receivers configured to perform transmission/reception of signals separately using the antenna coil of each of said plural antenna retaining portions; and
   a communication control unit configured to measure each electromagnetic field intensity or reception intensity based on received signals from each of said receivers and select one combination of said transmitter and said receiver to actively function.

8. An antenna unit as set forth in claim 6, further comprising:
a plurality of transmitters and receivers configured to perform transmission/reception of signals separately using the antenna coil of each of said plural antenna retaining portions; and
a communication control unit configured to time-divisionally process communication using respective combinations of said transmitters and said receivers and activate one combination of said transmitter and said receiver to which a link is made first.

9. An antenna unit as set forth in claim 6, further comprising:
a plurality of transmitters and receivers configured to perform transmission/reception of signals separately using the antenna coil of each of said plural antenna retaining portions; and
a communication control unit configured to time-divisionally process communication using respective combinations of said transmitters and said receivers to activate one combination of said transmitter and said receiver to which a link is made first, and measure each electromagnetic field intensity or reception intensity based on received signals from each of said receivers to successively switch to one combination of said transmitter and said receiver which are optimum.

10. A card processing system which performs a processing regarding use of a toll road for a vehicle passing through the toll road, the card processing system comprising:
an antenna unit which has an antenna retaining portion retaining in a tip portion thereof an antenna coil configured to perform wireless communication with an IC card through an electromagnetic coupling, and a drive mechanism configured to freely move said antenna retaining portion backward and forward between a position where said antenna retaining portion protrudes above the lane and a position where said antenna retaining portion is retracted in said unit;
a vehicle stop detecting unit configured to detect a stopping of a vehicle on the lane; and
a control unit configured to control said drive mechanism of said antenna unit so that said antenna retaining portion protrudes above the lane when said vehicle stop detecting unit detects the stopping of the vehicle on the lane.

11. A card processing system as set forth in claim 10,
wherein said vehicle stop detecting unit comprises:
an image pickup device configured to pick up an image of the lane; and
a sensing unit configured to sense existence of the vehicle on the lane, and
wherein said control unit controls said drive mechanism of said antenna unit so that said antenna retaining portion protrudes above the lane when a movement is not detected in an image picked up by said image pickup device and said sensing unit senses the existence of the vehicle on the lane.

12. A card processing system as set forth in claim 10, further comprising:
a card approach detecting unit configured to detect an approach of the IC card to a tip of said antenna retaining portion; and
a control unit configured to control said drive mechanism of said antenna unit so that said antenna retaining portion protrudes above the lane when said card approach detecting unit detects the approach of the IC card to the tip of said antenna retaining portion.

13. A card processing system as set forth in claim 12,
wherein said card approach detecting unit further comprises:
an image pickup device configured to pick up an image between said antenna unit and the vehicle on the lane; and
a recognizing unit configured to recognize an extension of an arm from the vehicle as the approach of the IC card to the tip of said antenna retaining portion based on the image picked up by said image pickup device.

14. A card processing system as set forth in claim 12,
wherein said card approach detecting unit is configured to detect a disturbance in a magnetic field formed by the antenna coils.

15. An antenna unit installed on a roadside portion of a lane where a processing regarding use of a toll road is performed for a vehicle passing through the toll road, the antenna unit comprising:
an antenna portion which has a plurality of antenna coil configured to perform wireless communication with an IC card through an electromagnetic coupling;
a transceiver configured to perform transmission/reception of signals separately using the antenna coil of said antenna portion; and
a communication control unit configured to select one of said plurality of antenna coil to actively function based on received signals from said transceiver.

16. An antenna unit as set forth in claim 15,
wherein said communication control unit time-divisionally and successively drives said plurality of antenna coil and activates one of said plurality of antenna coil to which a link is made first.

17. An antenna unit as set forth in claim 15,
wherein said communication control unit time-divisionally and successively drives said plurality of antenna coil and activates one of said plurality of antenna coil to which a link is made first, and measures each electromagnetic field intensity or reception intensity based on received signals from said transceiver and successively switch to one of said plurality of antenna coil which are optimum.

18. An antenna unit as set forth in claim 15, the antenna unit further comprises a suspension control unit configured to stop driving said antenna coil which is not selected.

* * * * *